US008973740B2

(12) United States Patent
Overley et al.

(10) Patent No.: US 8,973,740 B2
(45) Date of Patent: Mar. 10, 2015

(54) METHODS OF PROCESSING ROLLS OF FIBROUS MATERIALS

(75) Inventors: Matthew Bernard Overley, Deerfield Township, OH (US); Wesley Bernard Brokopp, Middletown, OH (US); Joseph Clifford Noll, Cincinnati, OH (US); Jeffrey Dean Hartline, Petersburg, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 254 days.

(21) Appl. No.: 13/517,695

(22) Filed: Jun. 14, 2012

(65) Prior Publication Data
US 2012/0321429 A1 Dec. 20, 2012

Related U.S. Application Data

(60) Provisional application No. 61/497,114, filed on Jun. 15, 2011.

(51) Int. Cl.
*B65G 21/06* (2006.01)
*B65B 25/14* (2006.01)

(52) U.S. Cl.
CPC .................................. *B65B 25/146* (2013.01)
USPC ............................ 198/617; 198/383; 198/389

(58) Field of Classification Search
USPC .......................................... 198/383, 389, 617
See application file for complete search history.

(56) References Cited

U.S. PATENT DOCUMENTS

| 1,252,681 | A |   | 1/1918  | Friess |
|-----------|---|---|---------|--------|
| 1,877,269 | A |   | 9/1932  | Colgren |
| 2,813,617 | A | * | 11/1957 | Sheetz ........................ 198/454 |
| 3,050,174 | A |   | 8/1962  | Billett |
| 4,430,844 | A |   | 2/1984  | James |
| 4,433,774 | A |   | 2/1984  | Lopes |
| 4,557,341 | A | * | 12/1985 | Söderholm ..................... 177/16 |
| 4,572,760 | A |   | 2/1986  | Marchetti |
| 4,679,379 | A |   | 7/1987  | Cassoli |
| 4,747,480 | A | * | 5/1988  | Wedler et al. ................. 198/396 |
| 5,213,198 | A |   | 5/1993  | Kovacs |
| 5,228,572 | A |   | 7/1993  | Hendriks |
| 5,255,495 | A |   | 10/1993 | Kovacs |
| 5,301,793 | A |   | 4/1994  | Kovacs |

(Continued)

FOREIGN PATENT DOCUMENTS

DE    10 2009 025824 A1    11/2010
EP           1223126 B1      1/2002

(Continued)

OTHER PUBLICATIONS

All Office Actions in U.S. Appl. No. 13/517,686 and U.S. Appl. No. 13/517,695.

(Continued)

*Primary Examiner* — Douglas Hess
(74) *Attorney, Agent, or Firm* — Wednesday G. Shipp; Roddy Bullock

(57) ABSTRACT

The present disclosure is directed, in part, to a method of transporting rolls of a fibrous material. The method comprises providing a V-shaped conveying mechanism, stacking a plurality of the rolls of the fibrous material on the V-shaped conveying mechanism, and transporting the plurality of the rolls of the fibrous material between a first position and a second position.

7 Claims, 24 Drawing Sheets

(56) References Cited

U.S. PATENT DOCUMENTS

| | | | |
|---|---|---|---|
| 5,365,721 A | 11/1994 | Focke | |
| 5,377,478 A | 1/1995 | Kovacs et al. | |
| 5,433,063 A | 7/1995 | Kovacs et al. | |
| 5,447,012 A | 9/1995 | Kovacs et al. | |
| 5,533,609 A * | 7/1996 | Hulse | 198/415 |
| 6,484,475 B1 | 11/2002 | Neagle et al. | |
| 6,574,520 B1 | 6/2003 | Liu et al. | |
| 6,817,604 B2 | 11/2004 | Ohlmann et al. | |
| 6,854,242 B2 | 2/2005 | Stork et al. | |
| 6,938,393 B2 | 9/2005 | Timmerman et al. | |
| 6,990,715 B2 | 1/2006 | Liu et al. | |
| 7,014,032 B2 * | 3/2006 | Franzaroli | 198/399 |
| 7,104,031 B2 | 9/2006 | Baggot et al. | |
| 7,114,609 B2 | 10/2006 | Christman et al. | |
| 7,174,697 B2 | 2/2007 | Hada et al. | |
| 7,311,191 B2 | 12/2007 | Bahr | |
| 7,325,374 B2 | 2/2008 | Chrisman et al. | |
| 7,506,486 B2 | 3/2009 | Wegner et al. | |
| 7,684,889 B2 | 3/2010 | Focke | |
| 7,793,773 B2 * | 9/2010 | Beck et al. | 198/584 |
| 8,061,503 B2 * | 11/2011 | Ancarani | 198/398 |
| 2004/0144618 A1 | 7/2004 | McDonald et al. | |
| 2005/0173227 A1 | 8/2005 | Adamski | |
| 2006/0175179 A1 | 8/2006 | Christman et al. | |
| 2009/0277745 A1 | 11/2009 | Spangler et al. | |
| 2010/0147651 A1 | 6/2010 | Ancarani | |
| 2011/0046772 A1 | 2/2011 | Healey et al. | |

FOREIGN PATENT DOCUMENTS

| | | |
|---|---|---|
| EP | 1 344 730 A1 | 9/2003 |
| EP | 1791757 B1 | 8/2008 |
| FR | 2 725 704 A1 | 4/1996 |

OTHER PUBLICATIONS

U.S. Appl. No. 13/517,695 International Search Report mailed Oct. 11, 2012.

\* cited by examiner

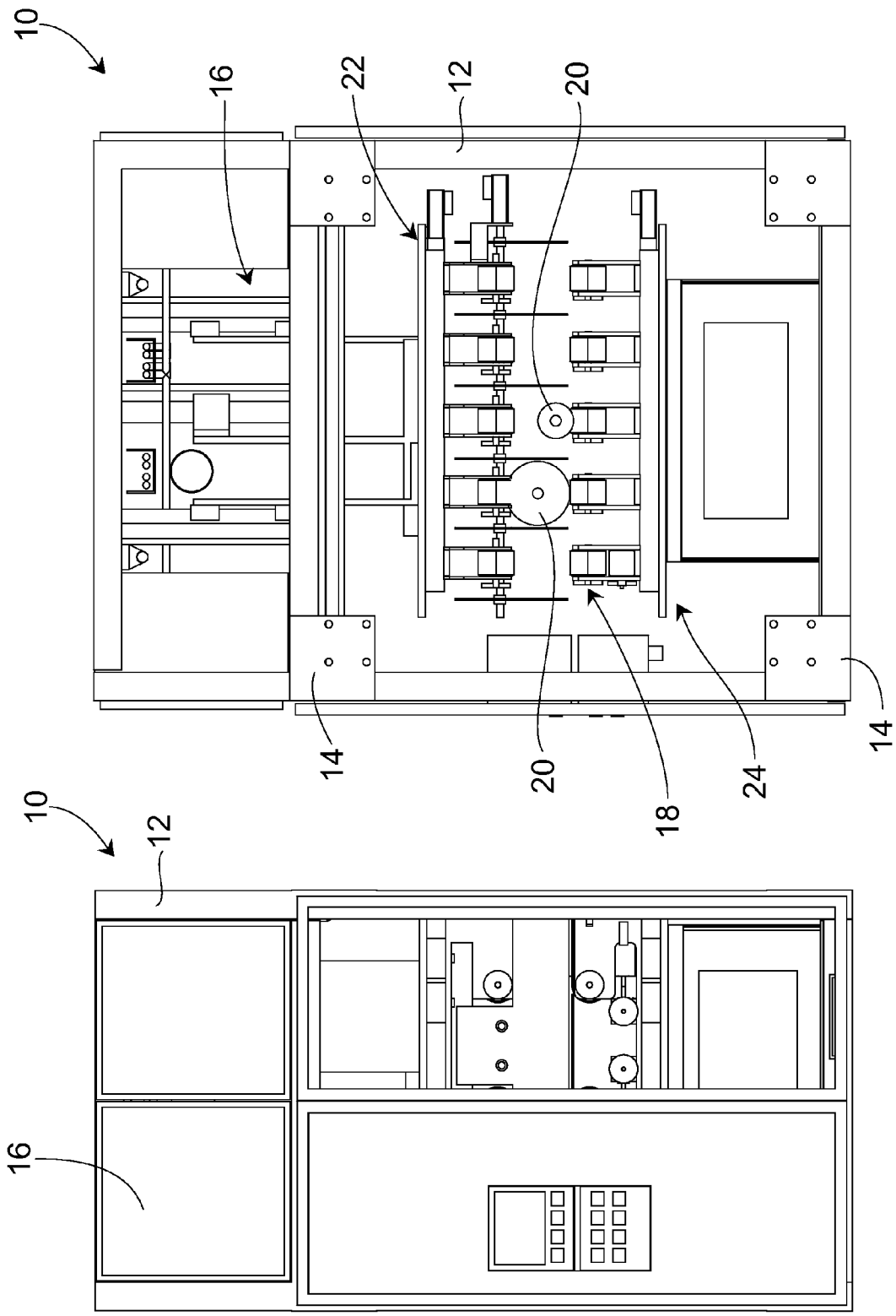

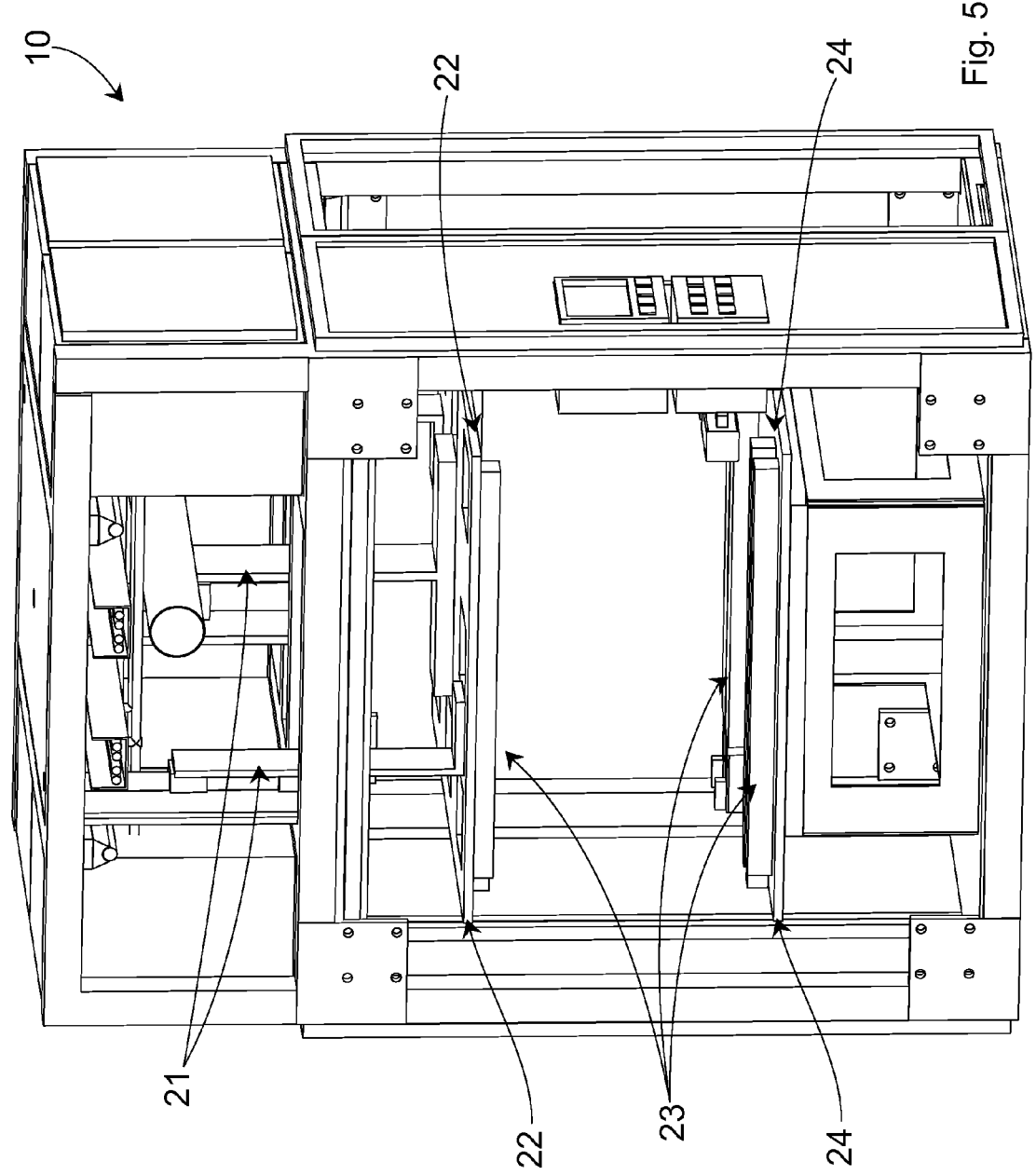

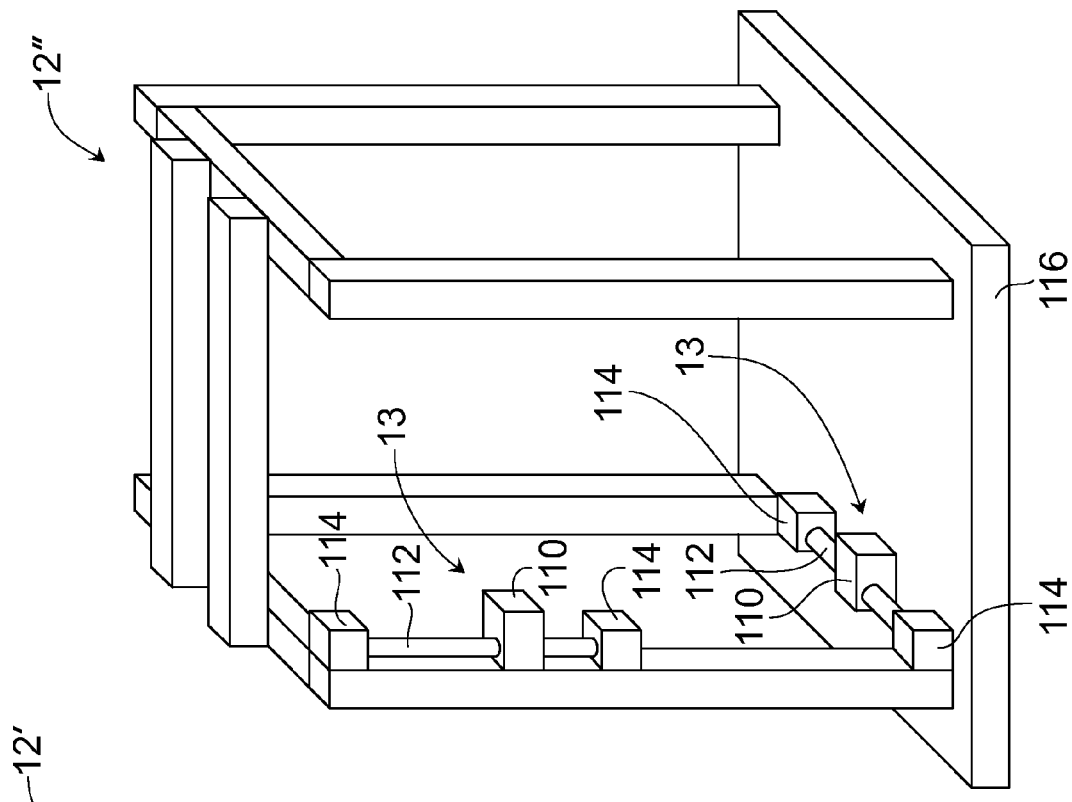
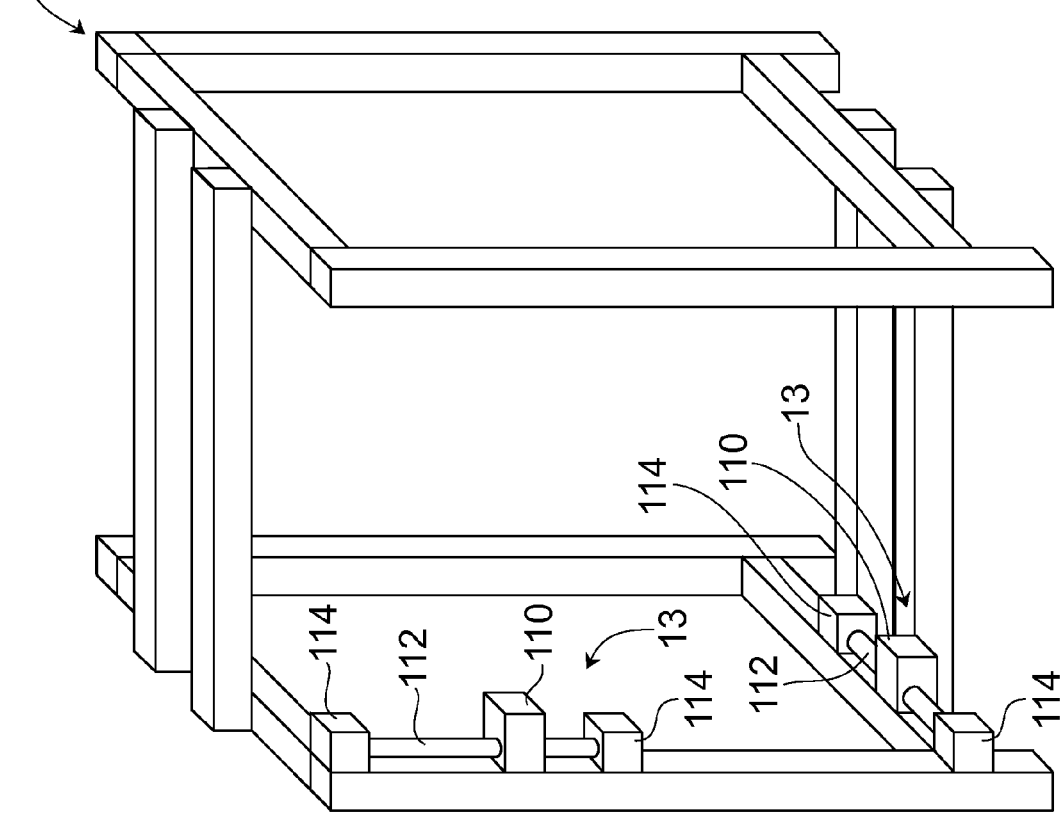

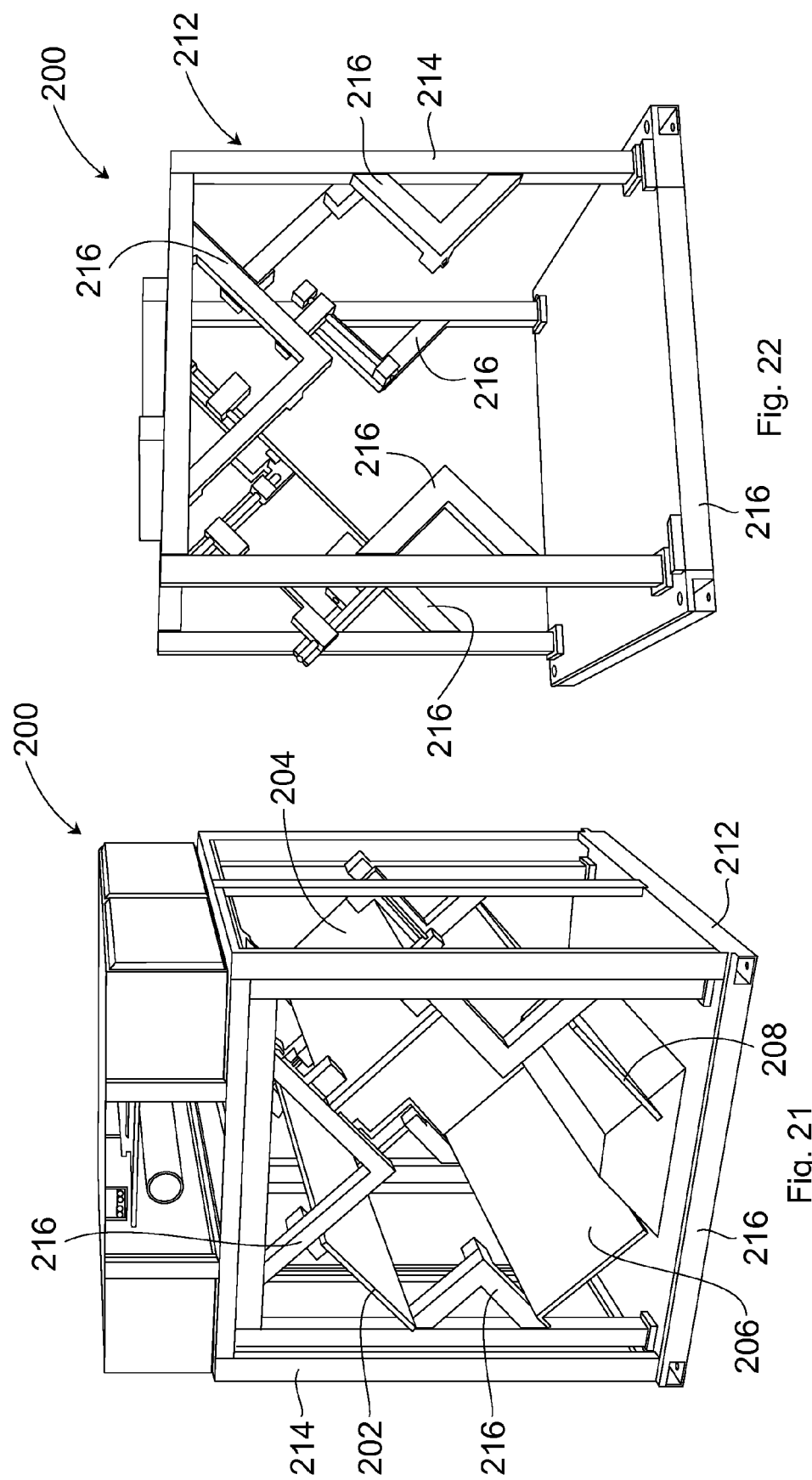

METHODS OF PROCESSING ROLLS OF FIBROUS MATERIALS

CROSS REFERENCE TO RELATED APPLICATION

This application claims the benefit of U.S. Provisional Patent Application Ser. No. 61/497,114, filed on Jun. 15, 2011, the entire disclosure of which is fully incorporated by reference herein.

FIELD

The present disclosure generally relates to methods of processing rolls of materials and, more particularly, relates to methods of processing rolls of fibrous materials.

BACKGROUND

Current manufacturing systems and equipment for the same have many limitations. In some instances, it is difficult and/or costly to reconfigure these systems and equipment for manufacturing a different product or for adding a new component or feature to an existing product because of the lack of flexibility within existing manufacturing systems and equipment. Furthermore, it is sometimes difficult to change or modify packaging methods and/or packaging configurations for various products using existing manufacturing systems and equipment again because of their lack of flexibility or their lack of easy change-out or change-over features. To alleviate these issues, some manufacturing systems have attempted to use modules in manufacturing systems. In various technical disciplines, however, the existing modules: (1) may not be truly modular (e.g., equipment extends from one module into another adjacent module), (2) may not be adaptable for a plurality of manufacturing steps or processes (i.e., the module may only be able to be used for one specific manufacturing step or process), (3) may only be configurable to manufacture a limited number of products, (4) may require a great deal of time and effort to change-over the module to perform a different step or process, and/or (5) may need to be replaced completely, or completely restructured, to produce different products, different product features, and/or different product arrangements. What is needed are methods of processing rolls of fibrous materials that overcome the issues identified above.

SUMMARY

In one form, the present disclosure is directed, in part, to a method of processing rolls of fibrous materials. The method comprises providing a module comprising an internal adjustment mechanism, attaching a first piece of equipment to the module to enable the module to perform a first function, and adjusting the module for the first piece of equipment using the internal adjustment mechanism of the module. The method further comprises removing the first piece of equipment from the module, attaching a second piece of equipment to the module to enable the module to perform a second function, and adjusting the module for the second piece of equipment using the internal adjustment mechanism of the module. The first piece of equipment is different than the second piece of equipment and the first function is different than the second function.

In another form, the present disclosure is directed, in part, to a method of processing rolls of fibrous materials. The method comprises providing a first module and a second module. Each of the modules comprises an internal adjustment mechanism. The method further comprises attaching a first piece of equipment to the first module and adjusting the first piece of equipment using the internal adjustment mechanism of the first module and independent of any adjustment mechanisms on the first piece of equipment. The method further comprises attaching a second piece of equipment to the second module and adjusting the second piece of equipment using the internal adjustment mechanism of the second module and independent of any adjustment mechanisms on the second piece of equipment. The first piece of equipment is different than the second piece of equipment and the first module is positioned upstream of the second module.

In still another form, the present disclosure is directed, in part, to a method of transporting rolls of a fibrous material. The method comprises providing a V-shaped conveying mechanism, stacking a plurality of the rolls of the fibrous material on the V-shaped conveying mechanism, and transporting the plurality of the rolls of the fibrous material between a first position and a second position.

In yet another form, the present disclosure is directed, in part, to a module for a modular manufacturing system. The module comprises a frame and a carriage movable relative to the frame. The movement of the carriage is in directions generally perpendicular to the direction of product flow through the module. The carriage comprises a base comprising a first equipment mount movably engaged with the base and a second equipment mount movably engaged with the base. The first and the second equipment mounts are moveable relative to each other in directions generally perpendicular to the direction of product flow through the module and generally perpendicular to the directions of movement of the carriage.

In still another form, the present disclosure is directed, in part, to a module for a modular manufacturing system. The module comprises a frame and a first carriage comprising a first portion and a second, separate portion. The first portion or the second, separate portion is independently movable relative to the other portion and relative to the frame. The module further comprises a second carriage comprising a first portion and a second portion. The first portion of the first carriage comprises a first base comprising a first equipment mount. The second portion of the first carriage comprises a second base comprising a second equipment mount. The first portion or the second portion of the second carriage comprises a base engaged with a conveyor.

In yet another form, the present disclosure is directed, in part, to a modular manufacturing system. The modular manufacturing system comprises a first module comprising a first piece of equipment and a second module comprising a second piece of equipment. The second module is positioned adjacent to the first module. A gap is defined intermediate the first module and the second module. No equipment extends into the gap from either of the first module or the second module. The first and second modules each comprise a first carriage, a second carriage, and an adjustment mechanism operably coupled to the first carriage or the second carriage. The adjustment mechanism is configured to move the first carriage or the second carriage relative to the other carriage.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein:

FIG. 3 is a side view of the module of FIG. 1 in accordance with one non-limiting embodiment;

FIG. 4 is a front view of the module of FIG. 1 in accordance with one non-limiting embodiment;

FIG. 5 is a perspective view of a module for a modular manufacturing system in accordance with one non-limiting embodiment;

FIG. 14 is a perspective view of a frame for a module of a modular manufacturing system in accordance with one non-limiting embodiment;

FIG. 15 is a perspective view of another frame for a module of a modular manufacturing system in accordance with one non-limiting embodiment;

FIG. 21 is a perspective view of another module for a modular manufacturing system in accordance with one non-limiting embodiment;

FIG. 22 is a perspective view of the module of FIG. 21 with various components removed in accordance with one non-limiting embodiment;

DETAILED DESCRIPTION

Figure 1:
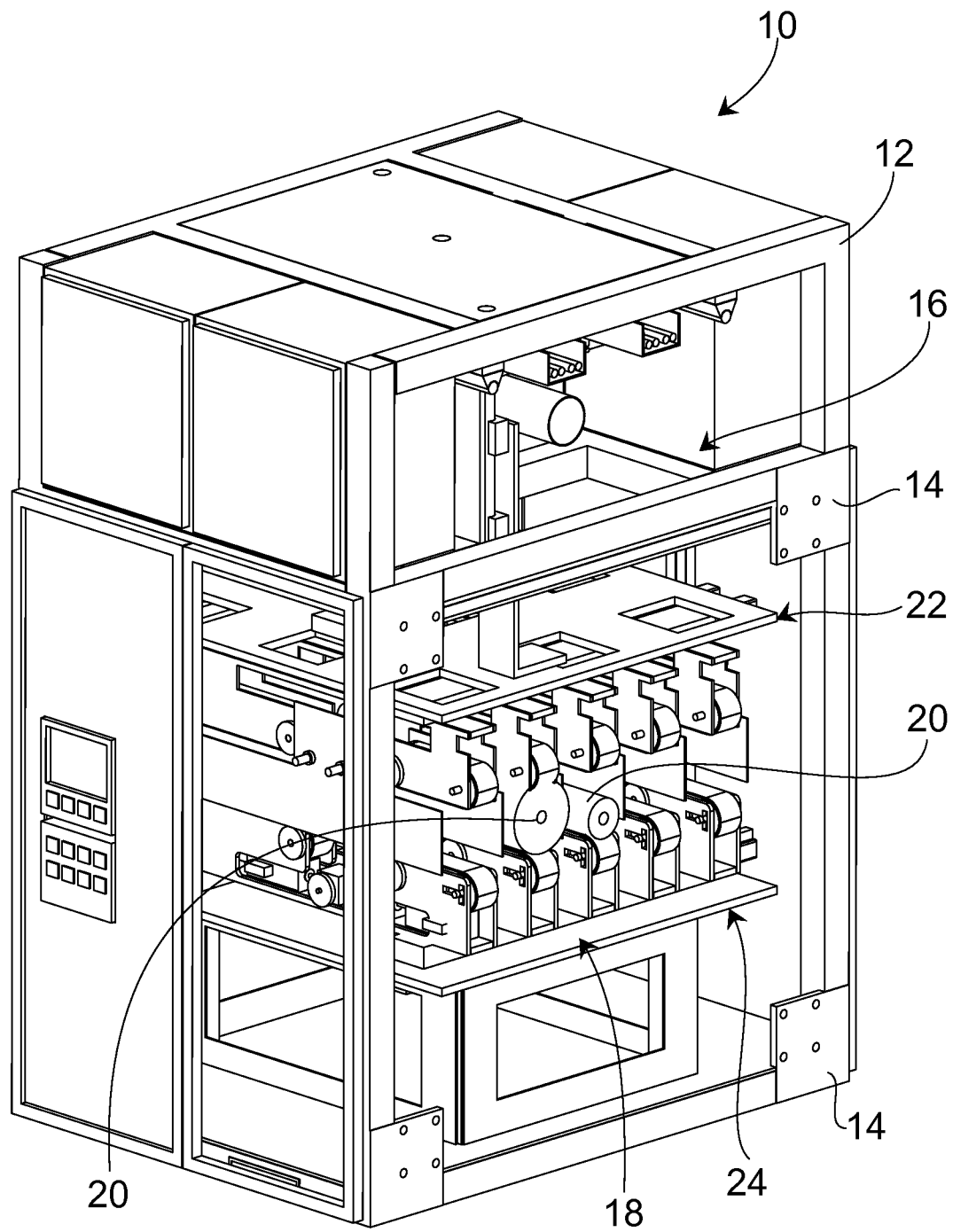
FIG. 1 is a perspective view of a module for a modular manufacturing system in accordance with one non-limiting embodiment.

Various non-limiting embodiments of the present disclosure will now be described to provide an overall understanding of the principles of the structure, function, manufacture, and use of the methods of processing rolls of fibrous materials disclosed herein. One or more examples of these non-limiting embodiments are illustrated in the accompanying drawings. Those of ordinary skill in the art will understand that the methods of processing rolls of fibrous materials described herein and illustrated in the accompanying drawings are non-limiting example embodiments and that the scope of the various non-limiting embodiments of the present disclosure are defined solely by the claims. The features illustrated or described in connection with one non-limiting embodiment can be combined with the features of other non-limiting embodiments. Such modifications and variations are intended to be included within the scope of the present disclosure.

The present disclosure provides, in part, modules for modular manufacturing systems. The modules can take on a plurality of forms, sizes, shapes, and/or configurations, examples of which are illustrated in the figures. Any suitable number of modules can be provided in a particular modular manufacturing system depending on a particular manufacturing need and/or manufacturing facility space limitation or requirement. As few as one module can be used to manufacture a product as well, but, in most instances, at least two modules can be combined to form a modular manufacturing system. The modules can be configured to manufacture, create, package, bottle, group, modify, transform, treat, orient, and/or combine, for example, (hereafter referred to together as "manufacturing") one or more products. The modules can each perform one or more functions. The products made by the modules can be the same type of products, different types of products, differently sized products, and/or the same type of products with different features. In one embodiment, a first product can be first size and a second product can be a second size. In still other embodiments, packages of or grouping of products created by the modules can have a plurality of different sizes and shapes, even for the same products.

In various embodiments, some example products that can be manufactured, or at least partially manufactured, by the modules of the present disclosure are paper towels or rolls thereof, toilet tissue or rolls thereof, shampoo, soap, dish soap, cosmetics, air fresheners, laundry detergent, body washes, diapers, wet or dry wipes, tampons, sanitary napkins, shaving devices and shaving gels, tooth paste and tooth brushes, dental floss, perfumes, lotions, batteries, cleaning implements, dog food, snacks, medicines, over-the-counter drugs, fabric softeners, deodorants, and/or cough drops. This list of products is by no means limiting, as a plurality of other products can also be manufactured by the modules of the present disclosure. In one embodiment, the modules of the present disclosure can be used in manufacturing processes for the automotive industry and the textile industry, for example.

The modules of the present disclosure can also be used in other manufacturing process in any other suitable industries.

One advantage of the modules of the present disclosure is that equipment can be easily mounted to the modules and removed from the modules when changing-over from manufacturing one product to another different product (i.e., differently sized product, different product all together, or the same product with different features). In many related technology modular manufacturing systems, a change-over from manufacturing one product to manufacturing another different product can be quite time consuming and costly. In some instances, such a change-over may not even be possible for particular related art modules. The modules of the present disclosure, however, are configured for easy change-over, such as by modifying, moving, adding to, and/or reconfiguring equipment mounted to portion of the modules and/or by simply replacing the equipment mounted to portions of the modules. Such replacement can be accomplished by merely unattaching a piece of equipment mounted to portions of the module, removing the piece of equipment from the portion of the module, and mounting another piece of equipment to the portion of the module. In one embodiment, equipment can be held to the portions of the modules using bolts, pins, rods, quick-connect mechanisms, and/or other attachment devices. It is noteworthy, that, in one embodiment, the equipment, as defined below, mounted within the modules can be completely contained within a frame of each of the modules and does not extend from the modules. Stated another way, the equipment does not extend past the perimeter of each module. This feature provides for easy change out of an entire module in a modular manufacturing system without the need to "untangle" equipment extending between more than one module or extending outside of a frame of a module.

Each module of the present disclosure can be the same or similar such that the modules can be universally used in a manufacturing system. Each module can comprise core elements, as a starting point (e.g., carriage, base, equipment mounts, utility corridor), and then equipment can be mounted to the module to provide the module with its desired functionality. In one embodiment, the size of each module can differ or be the same while still having the same core elements. For example, one or more normal sized modules, one or more supersized modules, and one or more small sized modules can be provided in a single modular manufacturing system. All of these modules or some of these modules can be used in a particular modular manufacturing system based on the particular manufacturing need. In other embodiments, each module of a modular manufacturing system can be the same, except possibly for the equipment mounted to each module. In any event, the core elements of each module can be the same, or at least similar, to provide universal, interchangeable modules.

In various embodiments, each module of a modular manufacturing system can comprise one or more of the following: "plug and play" power and communication systems (e.g., cables, wireless) that can interact with other modules (either upstream or downstream) in a modular manufacturing system, utility corridors and/or conduits for wires and/or cables, and utilities (e.g., compressed air, vacuum systems, cooling air, water, steam). Each module can also comprise onboard electrical cabinets, integrated guard doors for safety, safety circuits, other safety equipment, integrated lighting, standard operator interfaces, enclosure doors, shields, and/or guards to at least inhibit dust and/or dirt infiltration and reduce the noise produced by the module. In various embodiments, portions of the modules can comprise insulation material configured to at least inhibit sound and/or heat from escaping from the modules. In various embodiments, each module can also comprise one or more mounting and alignment portions or plates for connecting to, operably engaging with, and/or aligning with neighboring modules, standard forklift pickup channels, chains, and/or hooks, process window size adjustment mechanisms, multi-layer product capability, multi-lane product capability, and/or built in and/or attached conveyors and/or finished product conveyors. A module in the middle portion (i.e., not on one end) of a modular manufacturing system can be replaced without disrupting the functionality of upstream or downstream modules. A middle module can also auto adjust for product quality, properties, features, and/or sizes, for example, without interfering with upstream or downstream modules. In one embodiment, the modules of the present disclosure may not be sequence dependent in a particular modular manufacturing system. As an example, a fifth module in a modular manufacturing system can be interchanged with a second module in the system, for example. Such interchanging may require equipment remounting. In one embodiment, some of all of the modules can have wheels or rollers attached thereto for easy manipulation of the modules.

In one embodiment, referring to FIGS. 1-4, a module 10 for a modular manufacturing system can comprise a frame 12. The frame 12 can define the perimeter of the module 10. In some embodiments, a return conveyor, not illustrated in FIGS. 1-4 (see e.g., FIG. 13), can be mounted to or formed with the frame 12 either inside or outside of the perimeter defined by the frame 12. Optional mounting brackets 14 or openings can be formed in or with the frame 12 or attached to the frame 12. Such mounting brackets 14 or openings can be used to attach one module 10 to another module 10, item, or piece of equipment. In other embodiments, the mounting brackets 14 may not be provided and a frame 12 of one module 10 can be mounted directly to a frame 12 of another adjacent module 10. In still other embodiments, the modules 10 in a manufacturing system or line can be positioned adjacent to each other without being physically attached to each other. In yet another embodiment, the modules 10 can be attached or engaged with each other using three-point attachment, as illustrated in FIG. 1. Instead of using the bottom mounting brackets 14, the mounting bracket 17 (shown in dash) can be used along with the top two mounting brackets 14. In such an embodiment, the two bottom mounting brackets 14 may not be provided. Such three-point attachment, in at least some embodiments, can allow for better engagement between the modules 10 when compared with four-point attachment. The three points of attachment between the modules 10 can be located at any suitable locations on the frame 12. Each mounting bracket in a three-point alignment system may only have one aperture in the mounting brackets, for example. In one embodiment, the various mounting brackets may be connected to each other using a T-shaped connector to maintain the modules in alignment with each other.

Figure 2:
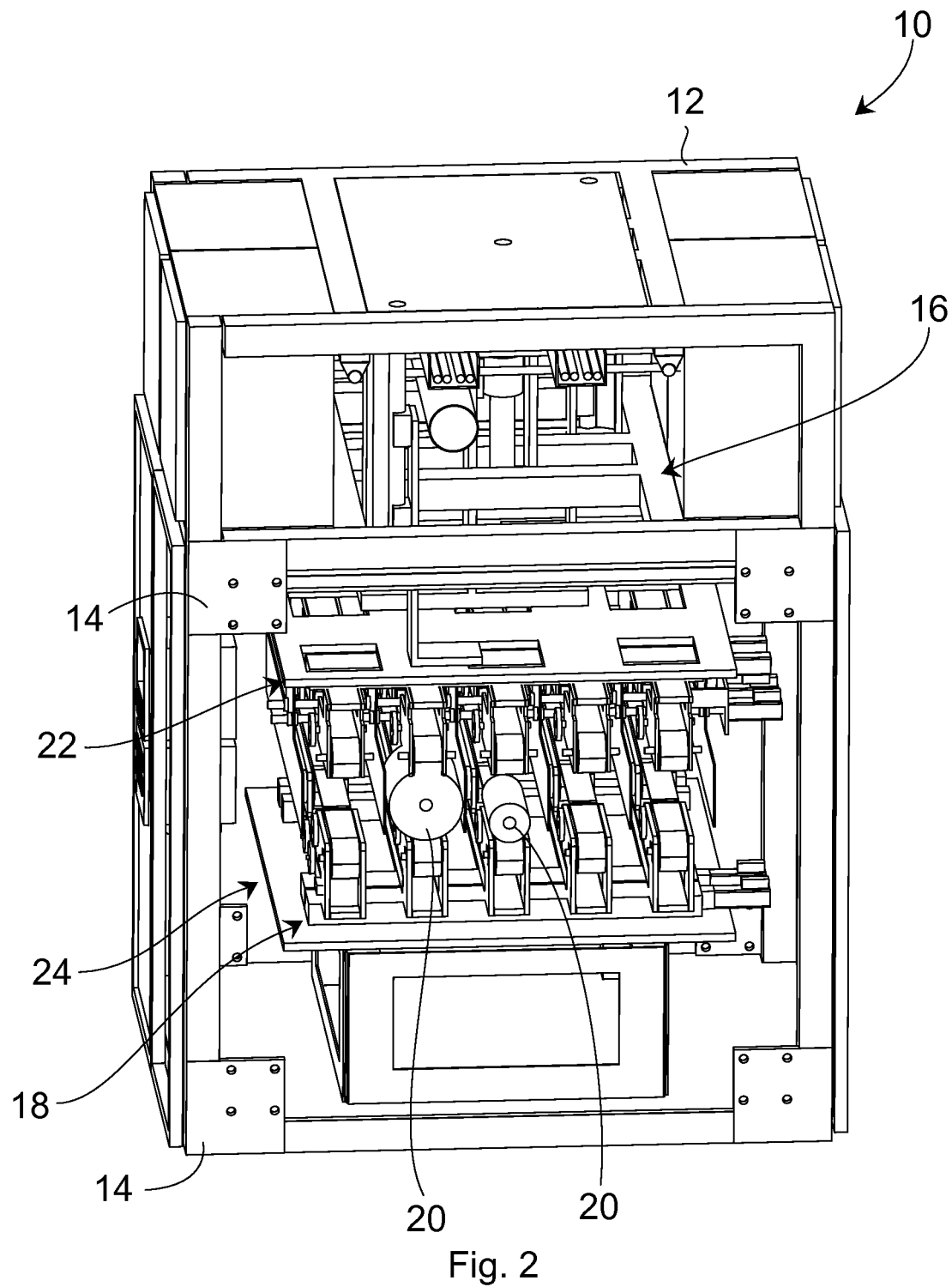
FIG. 2 is another perspective view of the module of FIG. 1 in accordance with one non-limiting embodiment.

In various embodiments, the frame 12 of each module 10 can define a utility corridor 16 that can have conduits running therethrough for power and communication lines. The conduits of a module 10 can align with conduits of other modules 10. The utility corridor 16, or other portion of each module 10, can comprise operator panels, electrical panels, safety circuits, cooling systems, vacuum systems, and/or lights, for example. In one embodiment, the utility corridor 16 can be located towards a top portion of each module 10, but can also be located at other locations on each module 10. The frame 12 can also define a "process window" 18 (generally the region between the carriages) through which a product or product packaging, or components of a product or product packaging (e.g., raw materials), can be conveyed or moved. Any modifications, transformations, groupings, and/or packaging of the product can occur in the process window 18. The modules 10 can be configured to define a single lane or multiple lanes for product or product packaging moving therethrough as illustrated in FIGS. 1, 2, and 4. In one example, rolls of paper products 20 are illustrated being conveyed through the module 10, but the present disclosure is not limited to such products.

The modules 10 can each comprise a carriage 22. The carriage 22 can be movable relative to the frame 12 in directions generally perpendicular to product flow through the module 10. The direction of product flow through the module 10 can be parallel to, or generally parallel to, the longitudinal axis of the rolls of paper product 20 in FIG. 2, for example. In some embodiments, only one carriage 22 may be provided in a module 10. In such an embodiment, a fixed plate or portion can be positioned on the opposite side of the process window 18 as the single carriage 22. The carriage 22 can move toward and away from the fixed plate or portion to adjust the height or other dimension of the process window 18. In one embodiment, the carriage 22 can be a first carriage 22 and a second carriage 24 can also be provided. The second carriage 24 can be movable relative to the frame 12 and relative to the first carriage 22 in directions generally perpendicular to the direction of product flow through the module 10. In such an instance, one or both of the first carriage 22 and the second carriage 24 can be moved toward and/or away from each other to adjust the height or other dimension of the process window 18. Other features of the various carriages of the modules 10 will be discussed in greater detail below.

In one embodiment, referring to FIG. 5, the module 10 can comprise the first carriage 22 and the second carriage 24. The first carriage 22 can be movable relative to the second carriage 24 using height adjustment mechanisms 21 as indicated in the figure. Width adjustment mechanisms 23 can also be provided on the first carriage 22 and/or the second carriage 24. These width adjustment mechanisms 23 can be integrated into the first carriage 22 and/or the second carriage 24. In one embodiment the second carriage 24 may or may not be moveable relative to the first carriage 22. In other embodiments, only the second carriage 24 may be movable relative to the first carriage 22.

Figure 6:
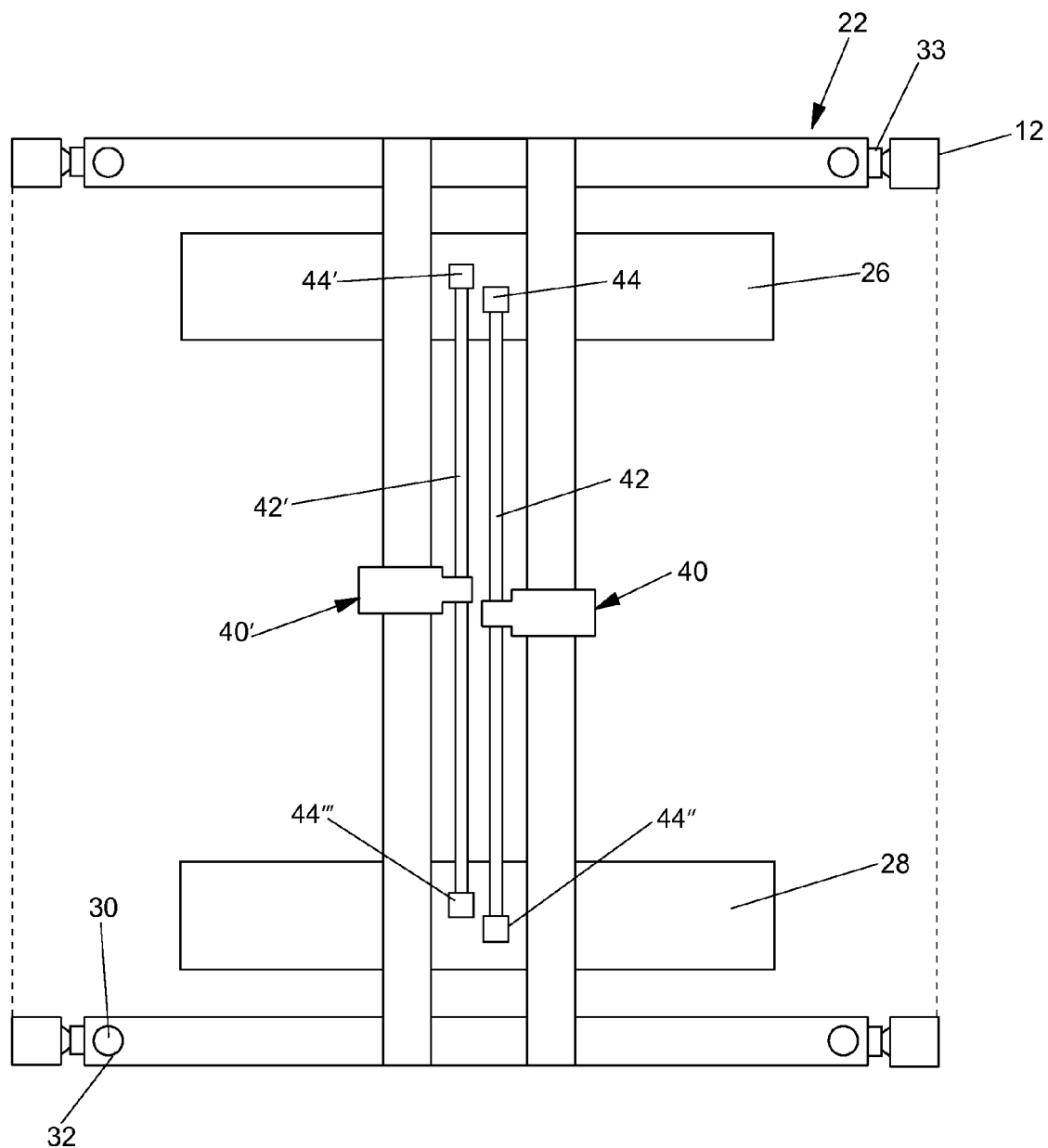
FIG. 6 is a top view of a first carriage for a module of a modular manufacturing system in accordance with one non-limiting embodiment.
Figure 7:
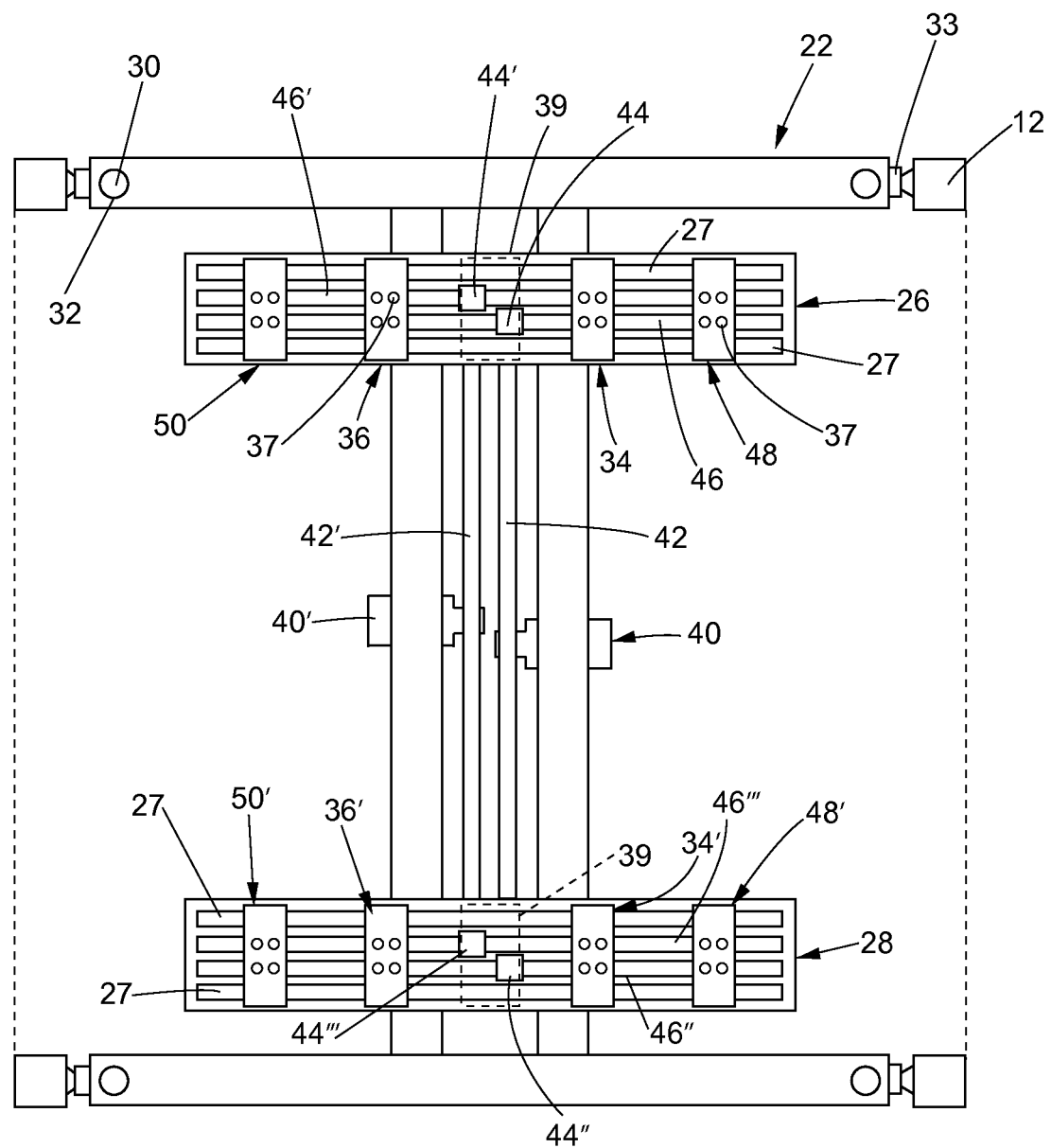
FIG. 7 is a bottom view of the first carriage of FIG. 6 in accordance with one non-limiting embodiment.

In one embodiment, FIG. 6 is a top view of the first carriage 22 engaged with the frame 12 and FIG. 7 is a bottom view of the first carriage 22 engaged with the frame. The first carriage 22 can comprise a first base 26 and a second base 28. In one embodiment, only a single base may be provided on the first carriage 22 and/or the second carriage 24. In other embodiments, more than two bases may be provided on the first carriage and/or the second carriage 24. The first carriage 22 can move within the module 10 with respect to the frame 12 in directions perpendicular to the direction of product flow through the module 10 (e.g., in generally vertical directions). The first carriage 22 can move via the use of the height adjustment mechanism 21 operably coupled to the first carriage 22 (see e.g., FIG. 5). The height adjustment mechanism 21 can comprise one or more threaded rods 30 that can be rotated by an actuator or one or more bars or plates that are movable through the use of an actuator for example. Other adjustment mechanisms for the first and second carriages 22 and 24 are described in greater detail below. The first carriage 22 can comprise one or more threaded apertures 32 that can each receive a portion of a threaded rod 30 for movement of the first carriage 22. As the actuator rotates the threaded rod 30 in a first direction, the first carriage 22 can move toward the second carriage 24 and as the actuator rotates the threaded rod 30 in a second direction, the carriage 22 can move away from the second carriage 24. In such an embodiment, the threaded rod 30 can be fixed, but can be capable of rotation so that the first carriage 22 can move relative to the threaded rod 30. The first carriage 22 can be engaged with the frame 12 using linear guides or guide tracks 33. In such an embodiment, the first carriage 22 can essentially be moved along a portion of the linear guides or guide tracks 33 when moving relative to the frame 12. Both of the first carriage 22 and the second carriage 24 can be completely contained within the frame 12. In one embodiment, the first carriage 22 can be fixed and the second carriage 24 can be movable (similar to or the same as movement the first carriage 22 described above) or both of the first carriage 22 and second carriage 24 can be fixed within the modules 10. In still other embodiments, both of the first carriage 22 and the second carriage 24 can be movable about the one or more threaded rods 30.

In one embodiment, still referring to FIGS. 6 and 7, the first base 26 can comprise at least one equipment mount movably engaged with the first base 26. In various embodiments, the first base 26 can comprise a first equipment mount 34 and a second equipment mount 36 movably engaged with the first base 26. The first and second equipment mounts 34 and 36 can slide or move along one or more tracks 27 (see FIG. 7) defined in the first base 26 or attached to the first base 26, when moved by an adjustment assembly. The adjustment assembly can comprise an actuator 40, such as a servo-motor, for example, configured to rotate a drive shaft 42. The drive shaft 42 can transmit rotation or torque to a gear box 44 or directly to a secondary drive shaft 46. The gear box 44 can comprise appropriate gearing, such as a pinion gear assembly, for example, to rotate the secondary drive shaft 46 upon rotation of the drive shaft 42. The gear box 44 can be a speed increasing gear box, a speed decreasing gear box, or a one to one gear box. In one embodiment, the secondary drive shaft 46 can be a threaded rod or can be a rod with threaded portions. In such an embodiment, the first equipment mount 34 and the second equipment mount 36 can have threaded apertures therethrough which are configured to receive portions of the threaded rod or at least the threaded portions of the threaded rod. Upon rotation of the secondary drive shaft 46, the first and second equipment mounts 34 and 36 can move toward or away from each other. The threads defined at least partially through the threaded apertures of the first and second equipment mounts 34 and 36 can be opposite to each other so that movement of the first and second equipment mounts 34 and 36, in unison, toward or away from each other can be accomplished. If movement of the first and second equipment mounts 34 and 36 in the same direction is desired, the threads of the threaded apertures can be the same as each other (i.e., the first equipment mount 34 moves in the same direction as the second equipment mount 36). In one embodiment, the threaded apertures on the first equipment mount 34 can have a different pitch than the threaded apertures on the second equipment mount 36. Such a feature can allow the first and second equipment mounts 34 and 36 to move toward and/or away from each other at different speeds when the secondary drive shaft 46 is rotated. In one embodiment, the first and second equipment mounts 34 and 36 can be operably linked to separate drive shafts or secondary drive shafts such that independent movement of the first equipment mount 34 relative to the second equipment mount 36 can be accomplished. This feature can be useful in a situation where funneling of the lanes of product through the module 10 is required. In various embodiments, the drive shaft 42 may not be provided and the secondary drive shaft 46 can be driven by an actuator, such as a motor, for example. Other equipment mounts, or pairs of equipment mounts, described herein can move in a similar fashion or the same fashion as described above.

In one embodiment, the first base 26 can comprise a third equipment mount 48 and a fourth equipment mount 50. The third and fourth equipment mounts 48 and 50 can move toward and away from each other, in unison, (or in the same direction) using a second adjustment assembly that is the same as, or similar to, the first adjustment assembly described above. As such, the second adjustment assembly can comprise an actuator 40', a drive shaft 42', a gear box 44', and a secondary drive shaft 46'. The third and fourth equipment mounts 48 and 50 can move independent of the first and second equipment mounts 34 and 36 owing to the provision of the second adjustment assembly. In one embodiment, the second adjustment assembly may not be provided and all of the first, second, third, and fourth equipment mounts 34, 36, 48, and 50 can be operably linked to the first adjustment assembly and/or to the same secondary drive shaft. In such an instance, the first and the second equipment mounts 34 and 36 can move toward or away from each other as the third and fourth equipment mounts 48 and 50 move toward or away from each other.

In various embodiments, any suitable number of equipment mounts can be provided on the first base 26 or another base, such as one, two, four, six, eight, ten, twelve, fourteen, or sixteen, for example. In one embodiment, each equipment mount can correspond to a product lane (even number of product lanes) for a roll of toilet tissue or paper towels, for example. In other embodiments, if lane guides are mounted to the equipment mounts, the product lanes can exist between the equipment mounts to provide an odd number of product lanes. If an odd number of equipment mounts are desired on the first base 26, or another base, an additional equipment mount 39 (illustrated in dash in FIG. 7) can be provided on the first base 26 in a central portion thereof proximate to, or between, an axis of the drive shaft 42 and the drive shaft 42'. In such an embodiment, three, five, seven, nine, eleven, or thirteen product lanes can be provided. In such an embodiment with the additional equipment mount 39, if lane guides are mounted to the equipment mounts, an even number of product lanes can be provided. The additional equipment mount 39 is described in greater detail below with reference to FIG. 7B.

In one embodiment, the second base 28 can be the same as or similar to the first base 26 described above. As such, the second base 28 can comprise a first equipment mount 34', a second equipment mount 36', a third equipment mount 48', and a fourth equipment mount 50'. The equipment mounts 34', 36', 48', and 50' on the second base 28 can move similar to or the same as that described above with respect to the equipment mounts on the first base 26, including reference to the actuators 40 and 40', the drive shafts 42 and 42', secondary drive shafts 46" and 46''', and gear boxes 44" and 44'''. The second base 28 can also comprise five or more equipment mounts, only two equipment mounts, or even only one equipment mount. If only one equipment mount is provided, it can be fixed or movable (using one of the adjustment assemblies). In one embodiment, the first equipment mount 34 and the second equipment mount 36 on the first base 26 can move in unison with, or together with, the first equipment mount 34' and the second equipment mount 36' on the second base 28. Stated another way, rotation of the drive shaft 42 by the actuator 40 can cause the secondary drive shafts 46 and 46" to rotate, thereby moving the first and second equipment mounts 34 and 36 on the first base 26 and moving the first and second equipment mounts 34' and 36' on the second base 28 in unison or together. The first and second equipment mounts 34' and 36' can be referred to as a third equipment mount 34' and a fourth equipment mount 36' if only the first and second equipment mounts 34 and 36 are provided on the first base 26 (and not the third and fourth equipment mounts 48 and 50). In one embodiment, the third and fourth equipment mounts 48' and 50' on the second base 28 can move in unison, or together with, the third and fourth equipment mounts 48 and 50 on the first base 26 using the second adjustment assembly. Stated another way, rotation of the drive shaft 42' by the actuator 40' can cause the secondary drive shafts 46' and 46''' to rotate, thereby moving the third and fourth equipment mounts 48 and 50 on the first base 26 and moving the third and fourth equipment mounts 48' and 50' on the second base 28 in unison or together. In various embodiments, the third and fourth equipment mounts 48 and 50 on the first base 26 can move toward or away from each other at a different speed (different thread pitch in threaded apertures) than the third and fourth equipment mounts 48' and 50', for example. In one embodiment, the first base 26 can have a different number of equipment mounts as the second base 28. In other embodiments, the first base 26 can have the same number of equipment mounts as the second base 28. Each equipment mount on each base can be the same size or a different size. In its most general form, the first carriage 22 may only have the first base 26 having one or two equipment mounts.

Figure 7A:
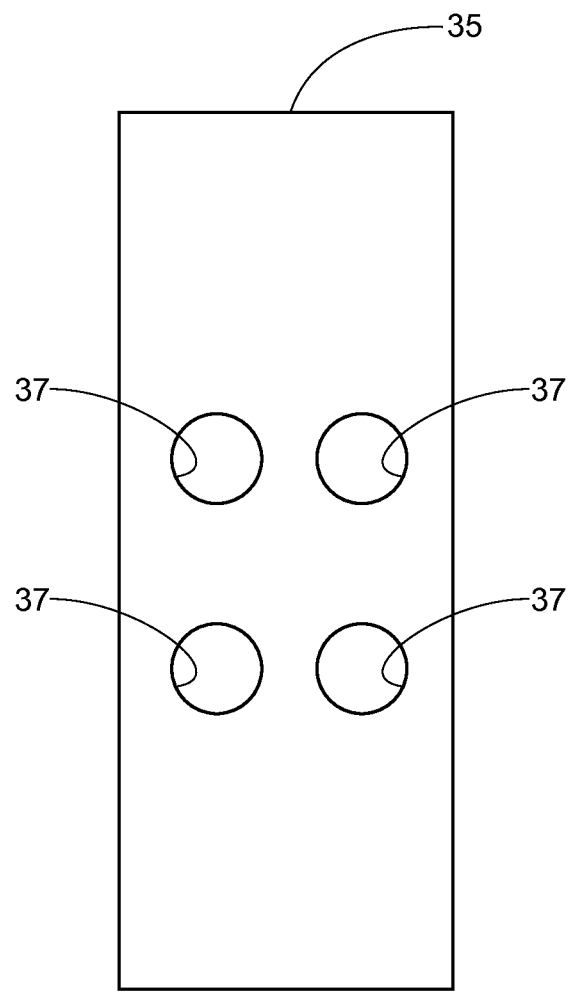
FIG. 7A is a top view of an equipment mount in accordance with one non-limiting embodiment.

FIG. 7A is a top view of one embodiment of an equipment mount 35. The equipment mount 35 can have one or more openings 37, such as threaded openings, for example, that are configured to receive bolts or other attachment members (e.g., pins, quick release fasteners, locking rods) extending from a piece of equipment. In other embodiments, the bolts or other attachment members can be separate from the piece of equipment and from the equipment mount 35 and can be engaged with both the openings 37 and openings in the piece of equipment to secure the piece of equipment to the equipment mount 35. In one embodiment, the openings 37 can have any suitable shape, such as a circular shape or an elongate shape, for example. Any suitable number or configuration of openings 37 can be provided on or through the various equipment mounts. In one embodiment, the pattern of the openings 37 can be standard across all modules 10, or can be different. In various embodiments, the equipment mount 35 and other equipment mounts of the present disclosure can have alignment pins extending therefrom that can engage apertures in equipment being mounted thereto. Similarly, the apertures can be in the equipment mounts and the pins can extend from the equipment. This can aid in the alignment and centering of the equipment with the equipment mounts. In some embodiments, it may be desirable to have equipment mounts with a narrow profile in the machine direction (i.e., in the direction of product flow though the module 10). This can allow the equipment mounts to collapse down to a smaller center-to-center distance. In one embodiment, the equipment mounts may not have openings 37 and the equipment can be attached to the equipment mounts using quick release clamps for tool-less engagement.

Figure 7B:
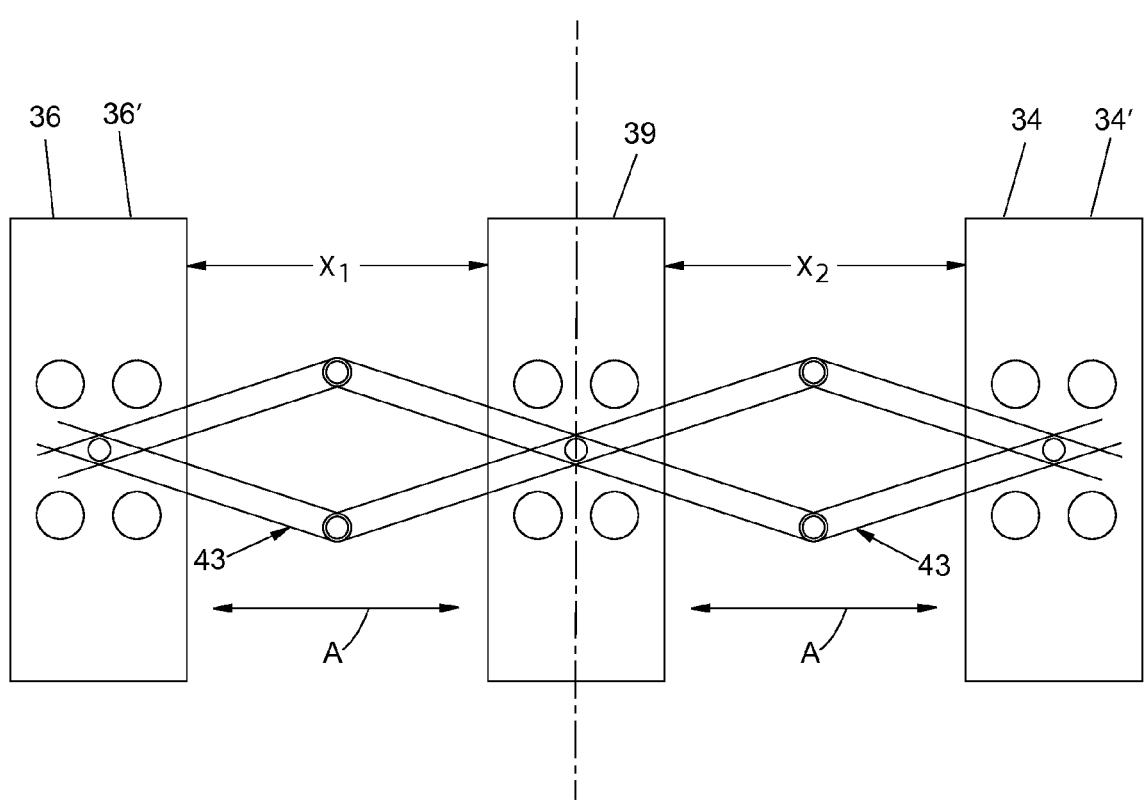
FIG. 7B is a top view of an additional equipment mount positioned intermediate a first equipment mount and a second equipment mount in accordance with one non-limiting embodiment.

FIG. 7B is a top view of an additional equipment mount 39 positioned intermediate the first equipment mount 34 and the second equipment mount 36. Another additional equipment mount can also be positioned intermediate the first equipment mount 34' and the second equipment mount 36'. The additional equipment mount 39 can be located on the bases 26 and 28, as illustrated in FIG. 7 by the dashed boxes. In one embodiment, the additional equipment mount 39 can be centrally located about the dashed line between the first equipment mount 34 and the second equipment mount 36. In various embodiments, the additional equipment mount 39 can be fixedly attached to the tracks 27 (not illustrated in FIG. 7B) or can be slidably engaged with the tracks 27. In other embodiments, the additional equipment mount 39 can be fixedly attached to one of the bases 26 and 28. If the additional equipment mount 39 is slidably engaged with the tracks 27 or not rigidly attached to a portion of one of the bases (i.e., floating), it can be linked to the first and second equipment mounts 34 or 34' and 36 or 36' using linkage assemblies 43. The linkage assemblies 43 can allow the additional equipment mount 39 to remain centered between the first equipment mount 34 or 34' and the second equipment mount 36 or 36' even after such equipment mounts have been moved by the adjustment assembly. The linkage assemblies 43, owing to their scissor-like configuration, can compress or expand in the directions indicated by arrows A when the first equipment mount 34 or 34' and the second equipment mount 36 or 36' move toward or away from each other. As such, the distance $X_1$ and the distance $X_2$ will be equal to, or at least substantially equal to, each other independent of the position of the first and second equipment mounts 34, 34', 36, and 36'. One advantage of providing the additional equipment mount 39 is to enable another piece of equipment to be mounted within a module. See, for example, FIGS. 1, 2, and 4 as an illustration of a module with five lanes or five equipment mounts, the center equipment mount being an additional equipment mount. Additional equipment mounts can also be positioned at other locations on the first base 26, the second base 28, and/or on other bases described herein to suit a particular manufacturing requirement.

Figure 8:
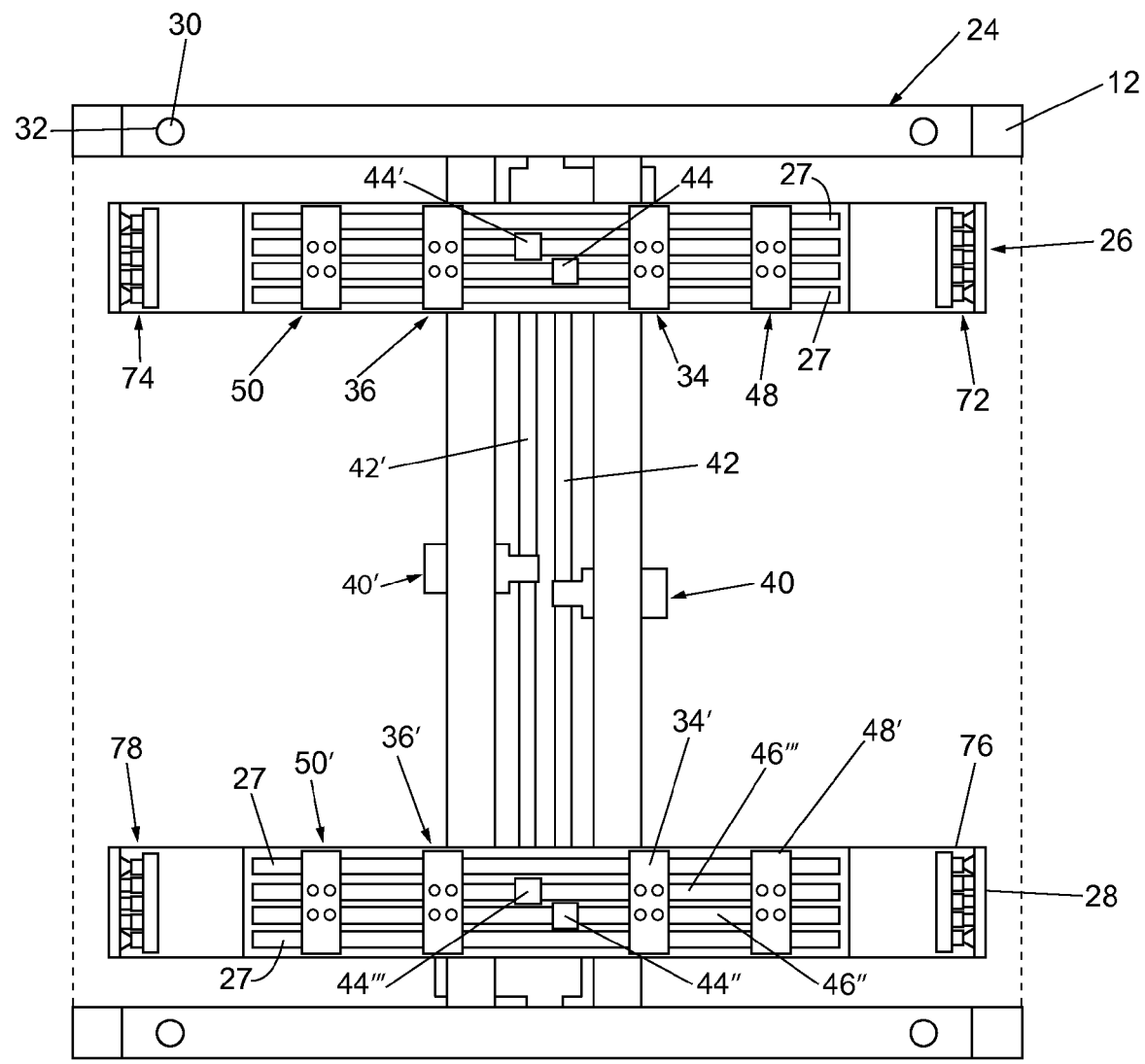
FIG. 8 is a top view of a second carriage for a module of a modular manufacturing system in accordance with one non-limiting embodiment.
Figure 9:
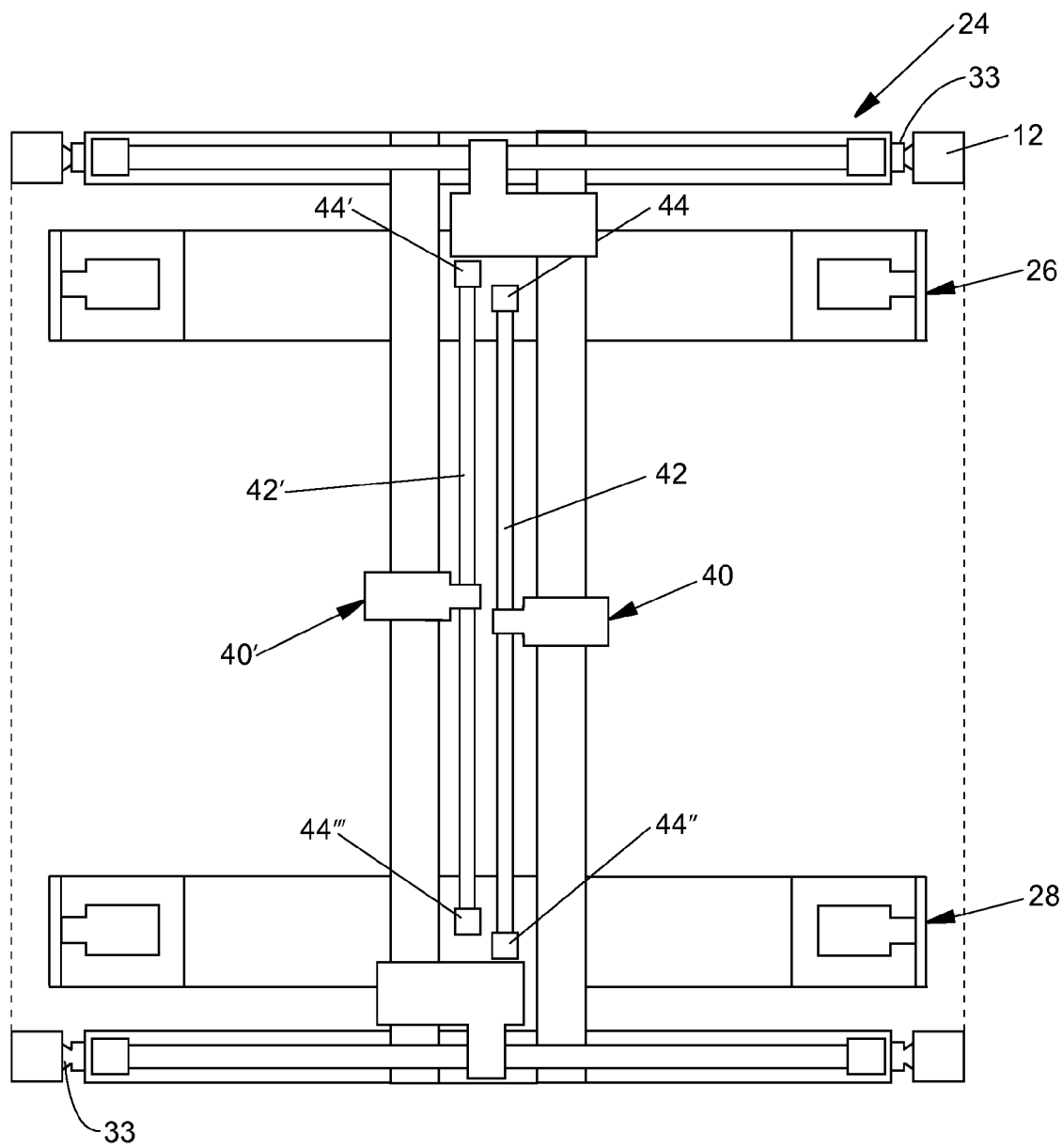
FIG. 9 is a bottom view of the second carriage of FIG. 8 in accordance with one non-limiting embodiment.

In one embodiment, FIG. 8 is a top view of the second carriage 24 engaged with the frame 12 and FIG. 9 is a bottom view of the second carriage 24 engaged with the frame 12. As discussed herein, the second carriage 24 may not be movable toward and away from the first carriage 22, but instead, may be fixed relative to the frame 12. In such an embodiment, the first carriage 22 may be moveable relative to the second carriage 24 and the frame 12. The second carriage 24 can have the same components as the first carriage 22 or different components as the first carriage 22. The second carriage 24 can function in the same or a similar fashion as the first carriage 22 and therefore, its functionality will not be described again here for brevity. The similar components of the second carriage 24 are numbered in FIGS. 8 and 9 like the components of the first carriage 22 illustrated in FIGS. 6 and 7 to illustrate that these components are the same or similar on both carriages 22 and 24.

Figure 10:
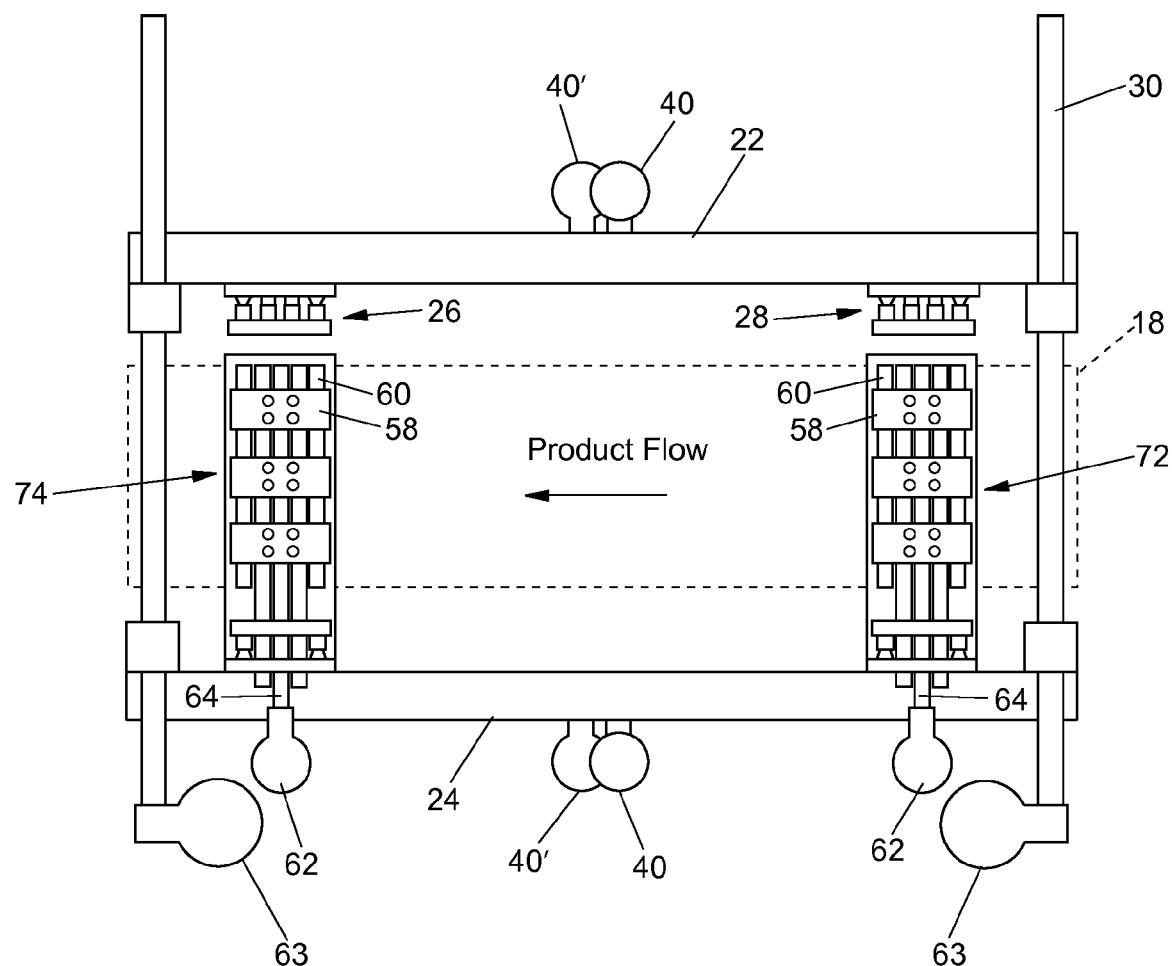
FIG. 10 is a cut away side view a module for a modular manufacturing system in accordance with one non-limiting embodiment.
Figure 11:
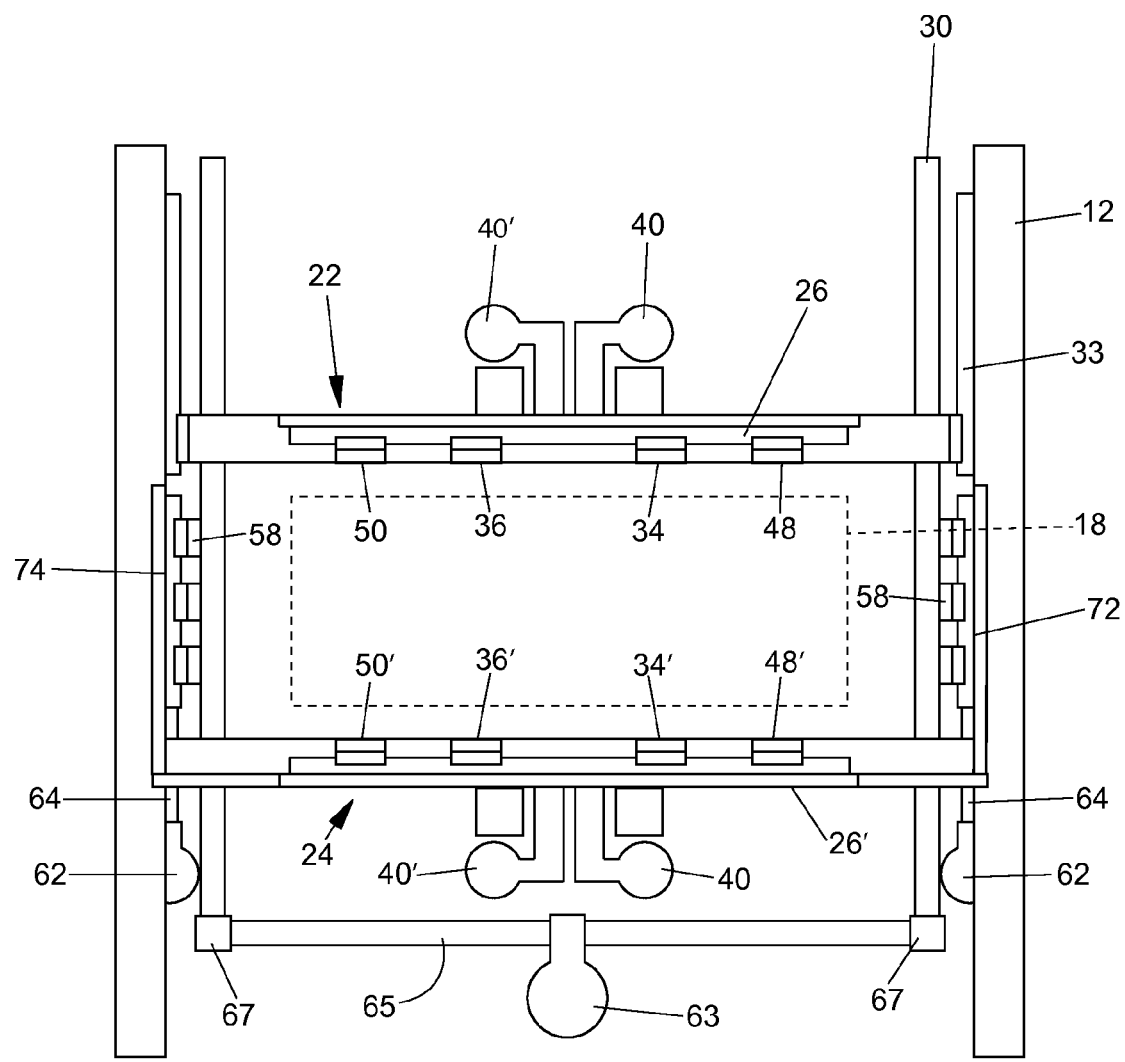
FIG. 11 is a front view of a module for a modular manufacturing system in accordance with one non-limiting embodiment.

In various embodiments, referring to FIGS. 8, 10, and 11, the first base 26 of the second carriage 24 can comprise a first additional base 72 and a second additional base 74 extending therefrom. The first and second additional bases 72 and 74 can be movable with the second carriage 24 or can be fixed, if the second carriage 24 is fixed. In other embodiments, the second carriage 24 can be movable and the first and second additional bases 72 and 74 can be fixed. The first and second additional bases 72 and 74 can extend vertically, or generally vertically, within one or more modules 10. These additional bases 72 and 74 can be provided on each module 10 to help support and/or drive layers or planes of product moving through the process window 18. The additional bases 72 and 74 can comprise one or more equipment mounts 58, which are movable relative to the bases 72 and 74, as described below. The equipment mounts 58 can be the same as or similar to that described above with respect to equipment mounts 34 and 36, for example. The second base 28 can comprise a third additional base 76 and a fourth additional base 78 similar to, or the same as, the first additional base 72 and the second additional base 74. In other various embodiments, the various additional bases can be attached to or extend from the first base 26 and/or the second base 28 of the first carriage 22. In still other various embodiments, the various additional bases can be engaged with the frame 12 or movably engaged with the frame 12, for example. In such an embodiment, the additional bases can be mounted on separate additional carriages, for example.

FIG. 10 is a side view of a portion of the module 10 and FIG. 11 is a front view of the portion of the module 10. In one embodiment, referring to FIGS. 8, 10, and 11, the second carriage 24 can comprise one or more additional bases 72, 74, 76, and 78 as described above. These additional bases 72, 74, 76, and 78 can move with the second carriage 24 or independent of the second carriage 24 in directions toward and away from the first carriage 22 and in directions generally perpendicular to the direction of product flow through the module 10. The additional bases 72, 74, 76, and 78 can also move toward and away from each other in directions generally perpendicular to the direction of product flow through the module 10 and generally perpendicular to the directions of movement of the first and second carriages 22 and 24. The equipment mounts 58 can move as described above in directions generally perpendicular to the direction of product flow through the module 10 and in directions generally perpendicular to the directions of movement of the first and second carriages 22 and 24. The additional bases 72, 74, 76, and 78 can each comprise one or more additional equipment mounts (like additional equipment mount 39), for reasons similar to that described above. Although not required, one benefit of providing the additional bases 72, 74, 76, and 78 is to provide additional equipment mounted on the equipment mounts 58 that are helpful in the manufacturing of the product passing through the modules 10, especially layers or stacks of product. In one embodiment, the equipment mounts 58 can be movably engaged with a track 60, similar to the equipment mounts described above. The equipment mounts 58 can move in unison in the same direction. In other various embodiments, the equipment mounts 58 can move, in unison, toward and away from each other. The equipment mounts 58 can also move independent of each other and can have a separate actuation assembly. In any event, movement can be accomplished through the use of an actuator 62 which is configured to rotate a drive shaft 64. The drive shaft 64 can be threadably engaged with threaded apertures in each of the equipment mounts 58. The threads of the threaded apertures can be oriented such that the equipment mounts 58 travel in one direction (e.g., upwardly) or in the other direction (e.g., downwardly) about the drive shaft 64. In other various embodiments, the threads of the threaded apertures can be oriented such that one equipment mount 58 moves in a first direction while another equipment mount 58 moves in a different direction about the drive shaft 64.

In one embodiment, referring to FIGS. 10 and 11, one or more actuators 63 can rotate one or more drive shafts 65 which can be operably linked to one or more threaded rods 30 via one or more gear boxes 67. The gear boxes 67 can transmit rotational motion or torque of the drive shafts 65 to the threaded rods 30 as is understood by those of skill in the art to move the first carriage 22 and/or the second carriage 24. The gear box 67 can be a speed increase gear box, a speed decreasing gear box, or a one to one gear box, for example.

In one embodiment, rolls of paper products, such as rolls of toilet tissue and/or rolls of paper towels, for example, can be processed using the modules and modular manufacturing systems of the present disclosure. One issue with packaging or bundling rolls of paper products is maintaining control of the rolls. This can be difficult at times owing to the cylindrical shape of the rolls. Rolls can sometimes be processed for packaging when lying on their curved outer surfaces (see e.g., FIGS. 1 and 2, element 20). By providing the additional bases 72, 74, 76, and 78 described above, the rolls of paper product can be better controlled, and inhibited from rolling movement, within the modules 10. This can also help maintain the rolls of paper product in their lanes while moving over or through the equipment mounted to each equipment mount. When the equipment mounted to the various equipment mounts acts on a product, the equipment is generally only effective where it contacts the product. For conveyor belts acting on radial portions of a cylindrical roll, the conveyor belt may only be effective on a small portion of the circumference of the roll. As a result, a very narrow conveyor belt can move product similar to a very wide conveyor belt, if the position of the narrow conveyor belt is adjusted in the cross-direction (i.e., generally perpendicular to the direction of product flow through the modules 10) so that the centerline of each narrow conveyor belt is close to the centerline of each roll moving to through the module 10.

In one embodiment, again referring to FIGS. 10 and 11, the first and second carriages 22 and 24 can be moved to the outer perimeter of the process window 18 or to outside of the process window 18 to mount equipment to the various equipment mounts, to remove equipment from the equipment mounts, and/or to perform maintenance on the equipment. By allowing the first and second carriages 22 and 24 to move to the outer perimeter of the process window 18 or to outside of the process window 18, the equipment on the first carriage 22 is moved a sufficient distance away from the equipment on to the second carriage 24, thereby providing working space within the process window 18. Such working space can provide easy access to the bolts or other attachment means mounting the equipment to the equipment mounts for easy change out, replacement, and/or maintenance. In various embodiments, one advantage of the modules 10 of the present disclosure is that the adjustment of the equipment within the process window 18 is made by the various carriages and equipment mounts and not by the equipment. In this way, the equipment is independent of the modules 10 and can easily be removed by detaching it from the mounts and unplugging any motors and/or sensors, for example. One main purpose of the adjustability of the various carriages and the equipment mounts is to provide "push button" changeover capability and provide the ability to adjust the positions of the equipment without shutting down the module 10. In one embodiment, the adjustment can be provided to optimize the manufacturing process to the varying properties of the product or raw material entering each module 10. Any of the actuators discussed herein can be replaced by one or more manual adjustment mechanisms (e.g., hand cranks or handwheels) where the automatic adjustment is not desired or needed.

Figure 12:
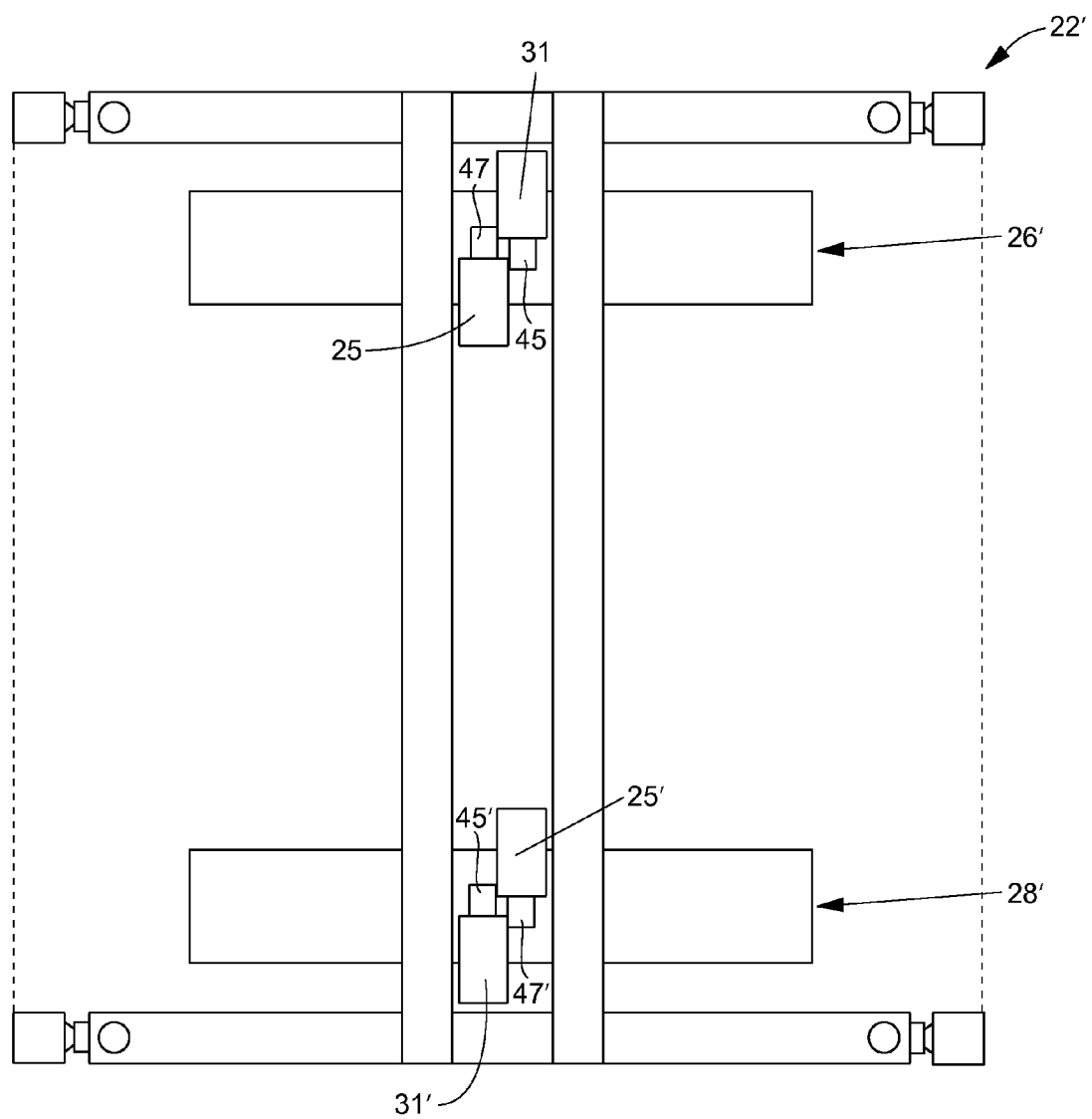
FIG. 12 is a top view of a first carriage for a module of a modular manufacturing system in accordance with one non-limiting embodiment.
Figure 13:
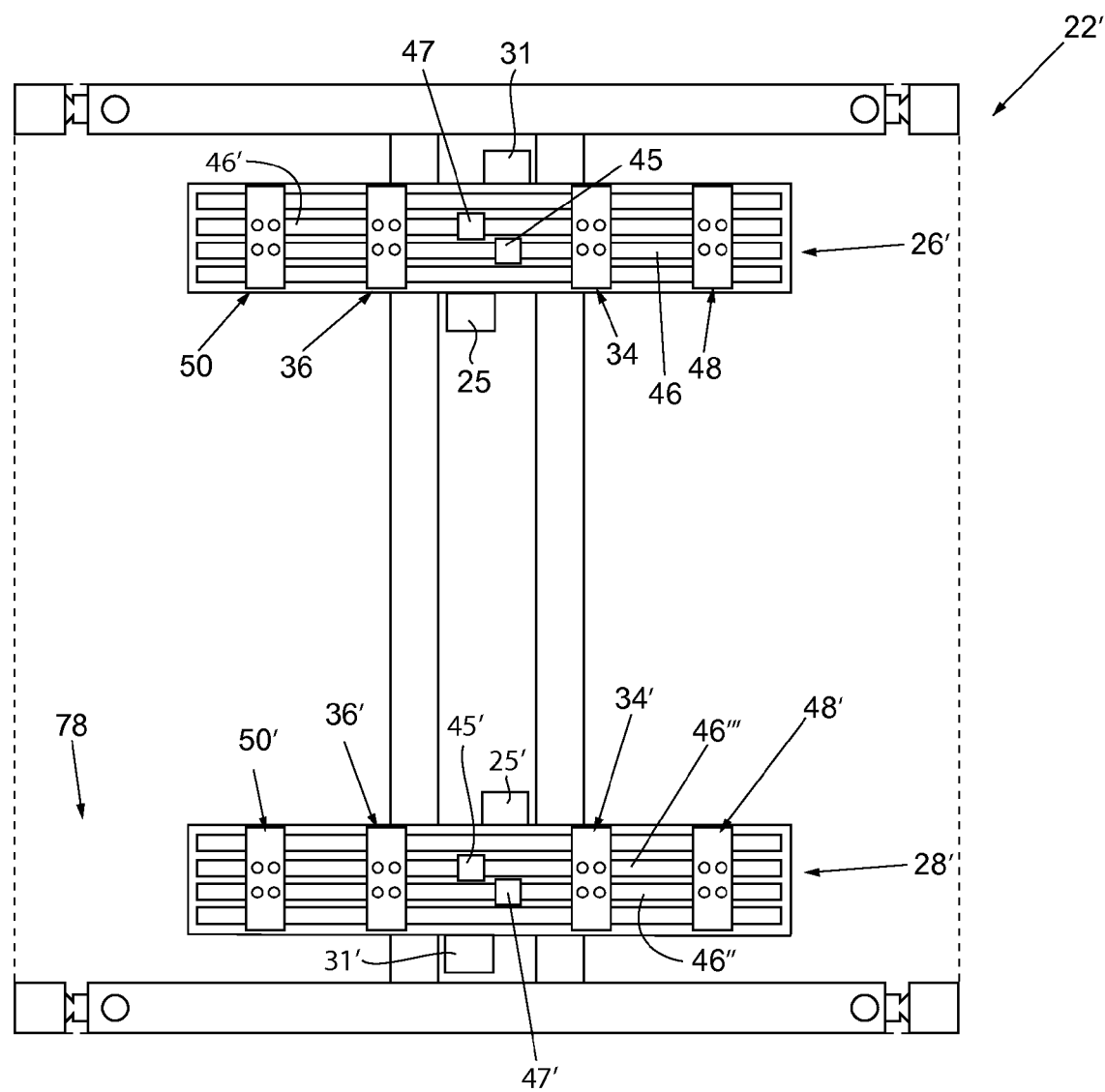
FIG. 13 is a bottom view of the first carriage of FIG. 12 in accordance with one non-limiting embodiment.

In one embodiment, referring to FIGS. 12 and 13, another first carriage 22' is disclosed. The first carriage 22' is similar to the first carriage 22, but the first and second equipment mounts 34 and 36 on a first base 26' are independently controlled from the first and second equipment mounts 34' and 36' on a second base 28'. This independent control of the first and second the equipment mounts is accomplished by providing an actuator 31 or 31' operably engaged with a gear box 45 or 45' that is operably engaged with the secondary drive shaft 46 or 46'. Such a feature can enable the first and second equipment mounts 34 and 36 on the first base 26' to move independent of the first and second equipment mounts 34' and 36' on the second base 28'. Likewise, third and fourth equipment mounts 48 and 50 on the first base 26' can be independently controlled from third and fourth equipment mounts 48' and 50' on the second base 28'. This independent control of the third and fourth equipment mounts is accomplished by providing an actuator 25 or 25' operably engaged with a gear box 47 or 47' that is operably engaged with the secondary drive shaft 46' or 46". Such a feature can enable the third and fourth equipment mounts 48 and 50 on the first base 26' to move independent of the third and fourth equipment mounts 48' and 50' on the second base 28'. The actuators 31 or 31', the gear boxes 45 or 45' or 47 or 47', and the secondary drive shafts 46 or 46' or 46' or 46" can together be referred to as an "adjustment assembly". The equipment mounts can be slidably engaged with one or more tracks as discussed above. Although not illustrated, a second carriage 24 can have the same features as the first carriage 22' to provide independent control to the equipment mounts on the first and second bases thereof. The other features of the first carriage 22' can be the same as or similar to that described above with respect to the first carriage 22 and will not be discussed again here for brevity.

In one embodiment, referring to FIG. 14, a frame 12' for a module of the present disclosure is illustrated. One or more adjustment mechanisms 13 (such as width and height adjustment mechanisms) are engaged with the frame 12'. The adjustment mechanisms 13 can each comprise an adjustment member 110 configured to move the carriages relative to and within the frame 12'. The adjustment member 110 can move along a threaded rod 112 when the threaded rod 112 is rotated by actuators operably engaged with gear boxes 114. The frame 12' can be comprised of a tubular frame structure that can be hollow or solid. The weight of the equipment attached to bases of the carriages can be supported by the tubular frame structure.

Figure 16:
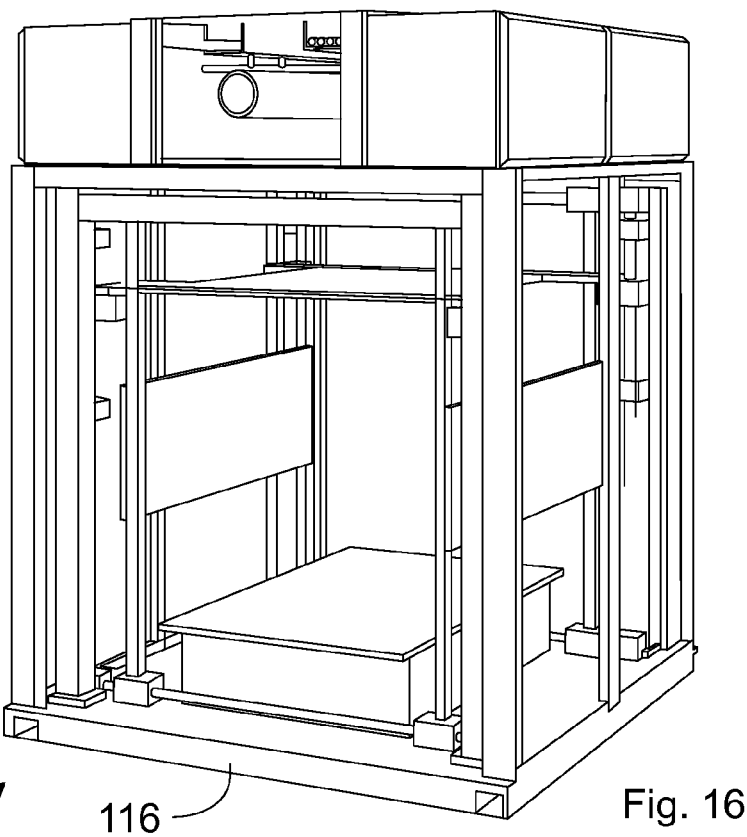
FIG. 16 is a perspective view of a module for a modular manufacturing system using the frame of FIG. 15 in accordance with one non-limiting embodiment.
Figure 17:
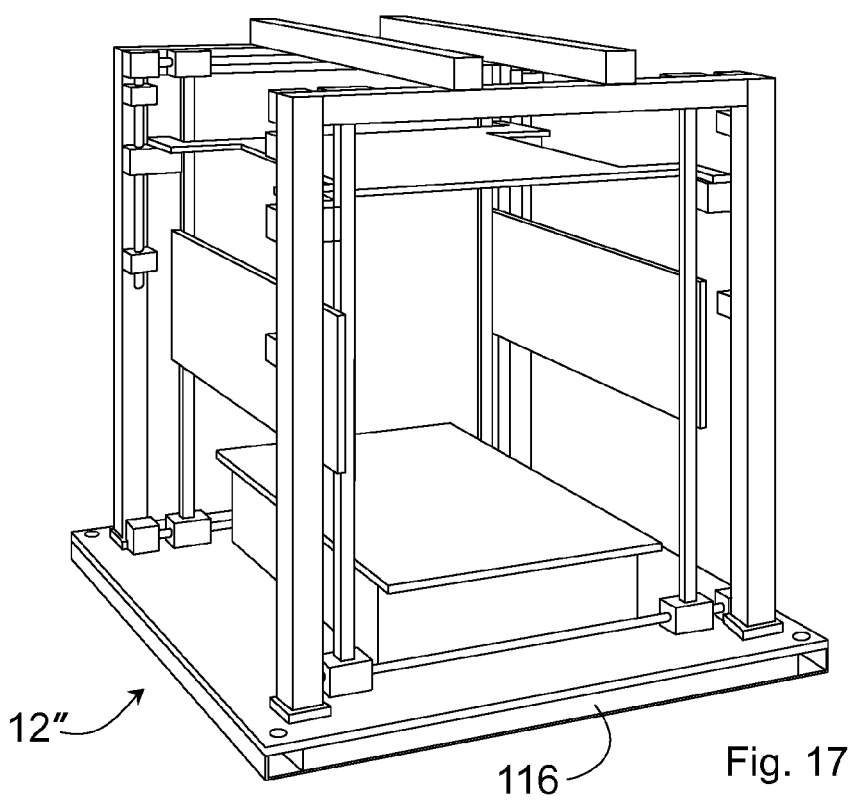
FIG. 17 is a perspective view of the module of FIG. 16 with various components removed for illustration in accordance with one non-limiting embodiment.

In another embodiment, referring to FIG. 15, a frame 12" for a module of the present disclosure is illustrated. One or more adjustment mechanisms 13 (such as width and height adjustment mechanisms) can be engaged with the frame 12". The various carriages of the present disclosure can be attached to the adjustment members 110 of the adjustment mechanisms 13 such that the carriages can be moved relative to and within the frame 12'. The adjustment mechanism 13 and the manner of movement of the adjustment members 110 can be the same as or similar to that described above with respect to frame 12'. The frame 12" can comprise a base plate 116. The base plate 116 can support the vertically extending portion of the frame 12". As a result, the various carriages and equipment mounted to bases of the carriages can be supported by the base plate 116 and the vertically extending portion of the frame 12". FIGS. 14 and 15 merely illustrate two different non-limiting examples of frame structures that can be used as a frame for the modules of the present disclosure. FIGS. 16 and 17 illustrate example modules, or portions thereof, built on the frame 12" of FIG. 15. Some of the components of FIG. 16 have been removed in FIG. 17 for clarity in illustrating the frame 12" and the base plate 116.

Figure 18:
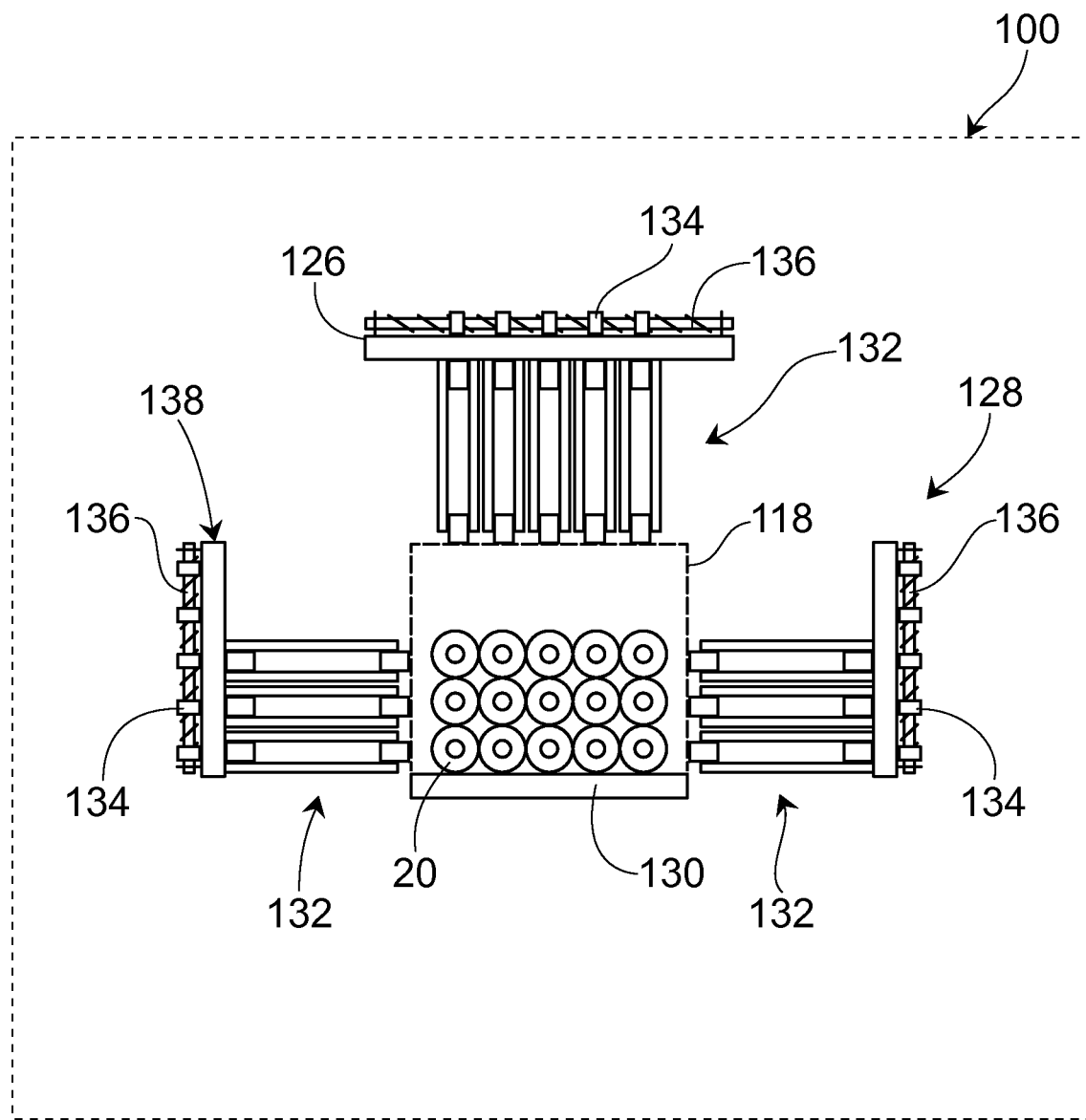
FIGS. 18-20 are front views of modules with various components removed for illustration in accordance with various non-limiting embodiments.
Figure 19:
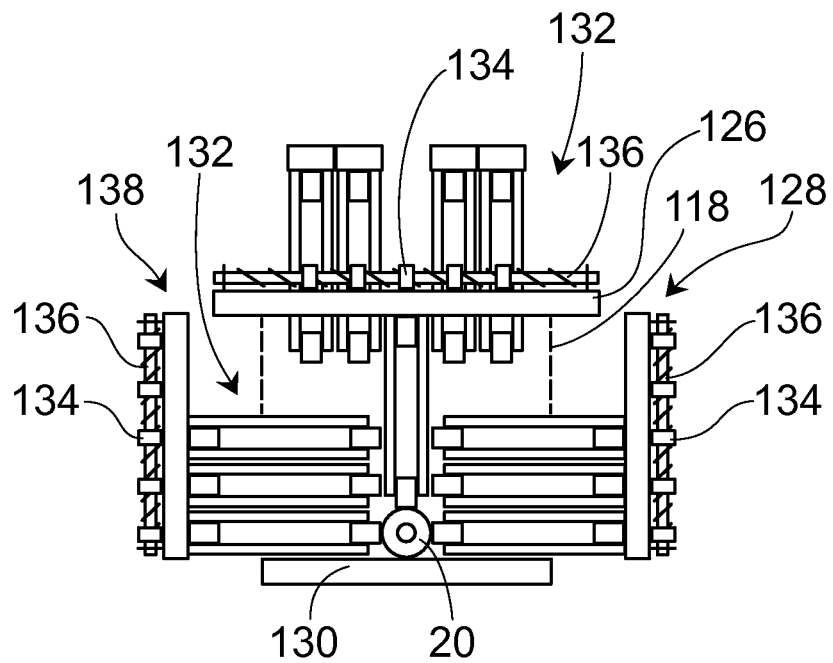
Figure 20:
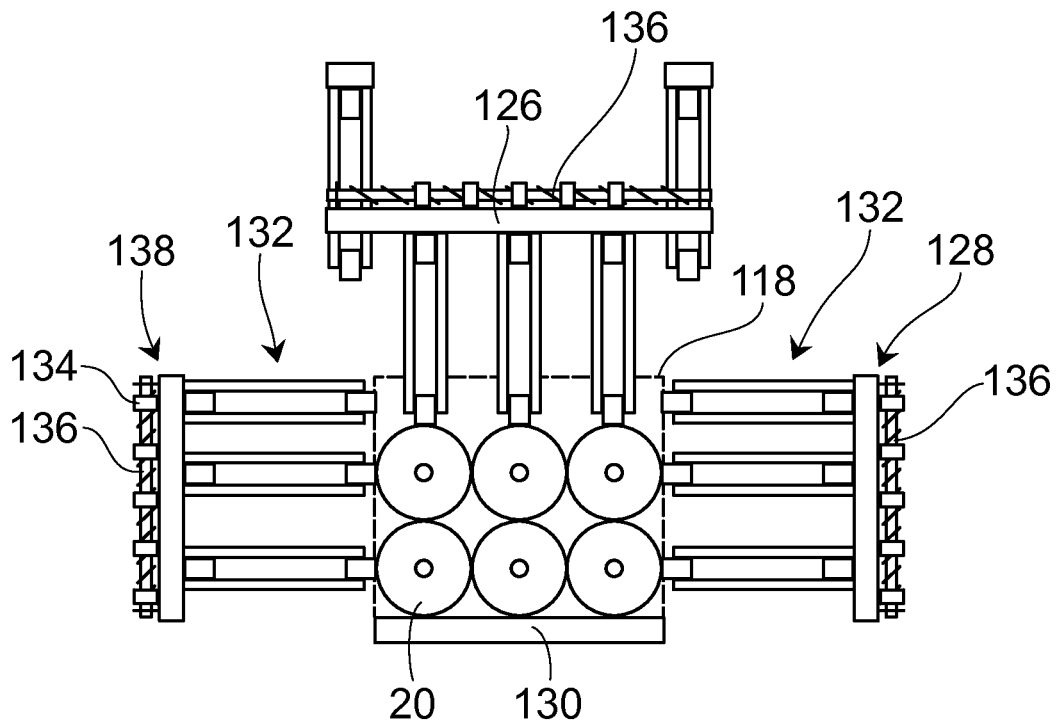

In various embodiments, referring to FIGS. 18-20, an example module 100 with various components removed is illustrated. FIGS. 18-20 all show front views of the example module 100. The perimeter and/or frame of the module 100 is defined by the outer dashed rectangle in FIG. 18 and the process window 118 is defined by the inner dashed rectangle in FIG. 18. The process window 118 is also illustrated in FIGS. 19 and 20. The process window 118 defines the largest space for product within a particular module. The process window 118 can be made smaller or larger based on the size of the module or based on the equipment positioned within the module. The various bases are illustrated without associated carriages, a module frame, and various other structures of the modules, for example, for clarity in illustration. The module 100 can comprise a fixed (in position) or movable bottom conveyor 130 on which rolls of paper product 20 can travel. The direction of movement of the rolls of paper product 20 through the module 100 is into or out of the page in FIGS. 18-20. The module 100 can comprise a first base 126, a first side base 128, and a second side base 138. In one embodiment, the first base 126, the first side base 128, and the second side base 138 can each comprise more than one base, although only one is illustrated because of the front view illustrated in the figures. Examples of two base configurations on a carriage are illustrated in FIGS. 12 and 13, for example. In various embodiments, one or more of the bases 126, 128, and 138 may not be provided. The first base 126, the first side base 128, the second side base 138, and the conveyor 130 can surround, at least partially surround the process window 118 and/or extend into the process window 118. As discussed herein, the process window 118 can define the maximum dimensions of product that the module 100 can process therethrough.

In various embodiments, each of the bases can have equipment 132, such as conveyor supports and conveyors or other equipment, for example, mounted to equipment mounts 134 thereof. One or more of the equipment mounts 134 can be movable along a threaded rod 136 or other movement mechanism. By allowing all or some of the equipment mounts 134 to move relative to each base, the equipment 132 can be adjusted for the size and number of product within the process window 118 (see FIG. 18 vs. FIG. 20 and note how the equipment 132 can move relative to the rolls of paper product 20 or other product being processed). At least one of the bases, such as the first base 126, for example, can define apertures or slots therethrough. A portion of, or all of, the equipment 132 can be retracted through the apertures or slots as the first base 126 and the threaded rod 136 move toward the conveyor 130. In one embodiment, referring to FIGS. 19 and 20, some equipment 132 can be retracted, while other equipment 132 may not be retracted for certain configurations of product being processed in the process window 118. The first and second side bases 128 and 138 can move into toward and away from a central portion of the process window 118 (i.e., into and out of the process window 118). In FIG. 19, the first and second side bases 128 and 138 and their associated equipment 132 are moved more into the process window 118 than in FIGS. 18 and 19. Referring again to FIGS. 18-20, it is illustrated how the module 100 can be used to process many different configurations of rolls of paper products 20 or other products depending on a particular manufacturing need. In FIG. 19, a small gap can be present between the equipment 132 extending from the first and second side bases 128 and 138 that is not contacting the product and the equipment 132 extending from the first base 126.

In one embodiment, it can be desirable to convey or process rolled paper products or other rolled products using a V-shaped conveyor or conveying mechanism to support the products. The V-shaped conveyor can be quite useful in conveying rolled products, such as rolled paper products, owing to the inherent stability that the rolled products have while stacked on a V-shaped conveyor or conveying mechanism. Stated another way, the rolls have a reduced tendency to roll while stacked on the V-shaped conveyor or conveying mechanism. This stability can be provided, at least in part, by supporting the rolled product from two sides with the V-shaped conveyor or conveying mechanism and through gravity acting on the stack of rolled products. Stacks of rolls in a diamond shape or rhombus shape can have more stability than a cube or rectangular shaped stack of rolled products (e.g., FIG. 18). As such, by using a V-shaped conveyor or conveying mechanism, better control of rolled products can be achieved and, thereby, more efficient processing or packaging of the rolled products can be achieved. To achieve a V-shaped conveyor or conveying mechanism, the process window of a module may be rotated about 20 to about 70 degrees, about 40 to about 50 degrees, or about 45 degrees, for example, as illustrated below.

In one embodiment, referring to FIGS. 21-24, another module 200 is illustrated. This module 200 can provide a "V-shaped" conveyor or conveying mechanism by providing a process window 218 (shown in dash in FIG. 23) that is rotated about 40 to about 50 degrees from the horizontal. The module 200 can have similar components as discussed above, such as a utility corridor, for example. These similar components will not be discussed again here for brevity. The module 200 can comprise a frame 212. The frame 212 can have a different configuration as the frames discussed above to process a diamond, rhombus, parallelogram, trapezoidal, pentagonal, or other shaped stack of rolls of paper products within the process window 218 of the module 200. The module 200 with carriages can be seen in FIG. 21. The module 200 can comprise four carriages, a first top carriage 202 (or first portion), a second top carriage 204 (or second portion), a first bottom carriage 206 (or first portion), and a second bottom carriage 208 (or second portion). The first and second top carriages 202 and 204 can move in unison or independent of each other. Likewise, the first and second bottom carriage can move in unison or independent of each other. The first and second top carriages 202 and 204 can be independent of or separate from each other and, likewise, the first and second bottom carriages 206 and 208 can be independent of or separate from each other. In other embodiments, the first and second bottom carriages 206 and 208 may be a single unit. The first and second bottom carriages 206 and 208 can form a V-shaped product receiving space within the process window 218. In other embodiments, bases mounted to the first and second bottom carriages 206 and 208 can form a V-shaped product receiving space within the process window 218. The various carriages can be oriented so that the process window 218 can be diagonally oriented, as illustrated as an example in FIG. 23. The frame 212 can comprise a tubular support section 214 extending from a base plate 216. The tubular support section 214 can comprise one or more projections 216, such as triangular or otherwise shaped projections, extending from each side of the frame 212. The various carriages can be engaged with or movably engaged with portions of the projections 216 or other portions of the frame 212. In one embodiment, the first and second bottom carriages 206 and 208 can be fixed and the first and second top carriages 202 and 204 can move with respect to the first and second bottom carriages 206 and 208 or vice versa. In another embodiment, the first and second bottom carriages 206 and 208 and the first and second top carriages 202 and 204 can move toward and away from each other. In one embodiment, the first top carriage 202 can move toward the second bottom carriage 208 and the second top carriage 204 can move towards the first bottom carriage 206. FIG. 22 is a view of the module 200 with various components removed for clarity in illustration.

Figure 23:
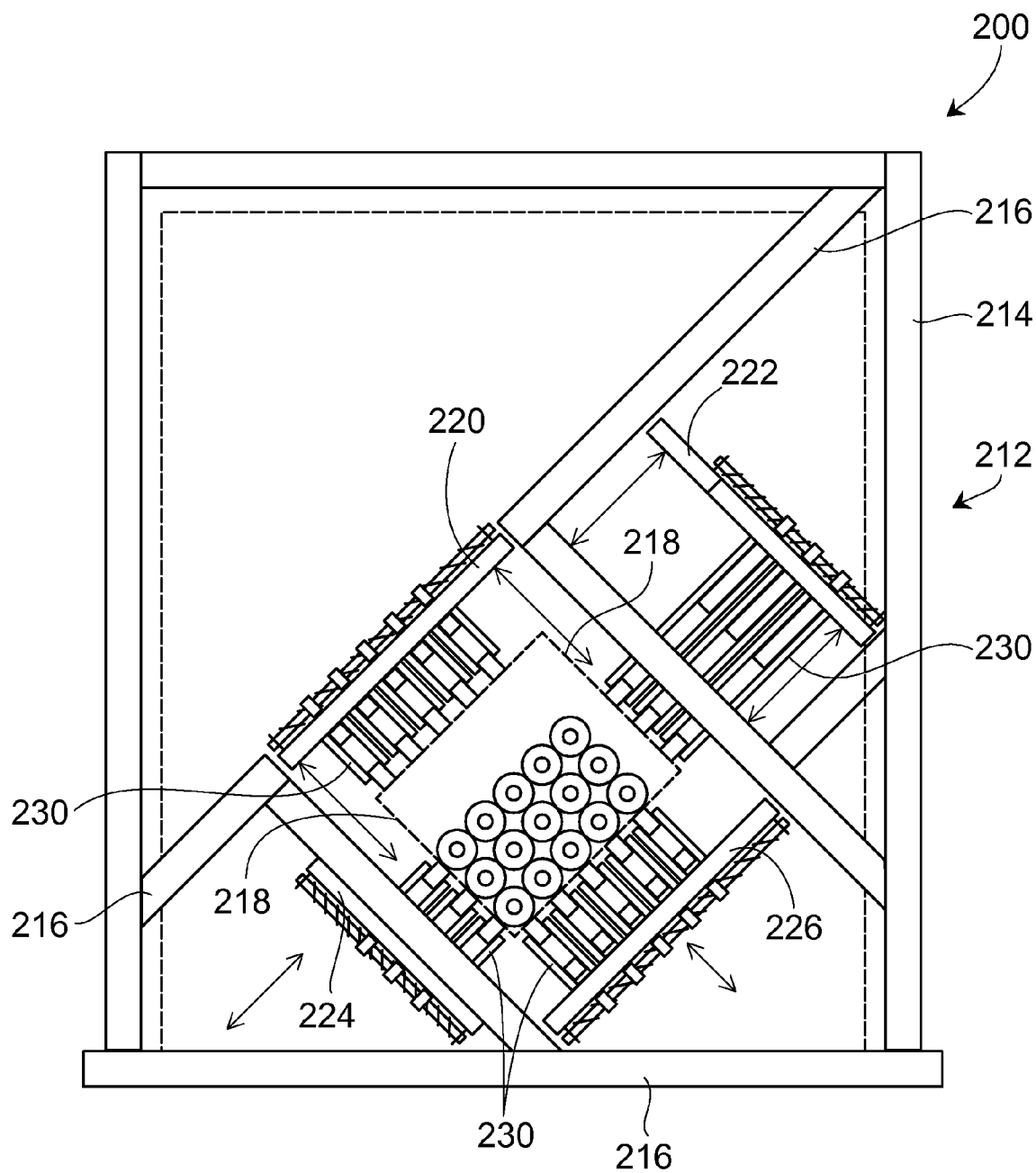
FIG. 23 is a front view of a module for a modular manufacturing system with various components removed for illustration in accordance with one non-limiting embodiment.

In one embodiment, referring to FIG. 23, example bases with equipment 230 mounted thereon and rolls of paper products positioned within the process window 218 are illustrated. The frame 212 is provided in FIG. 23 to illustrate how the bases and equipment 230 can be situated within the module 200. The various carriages are not illustrated in FIG. 23. As an example, the arrows in FIG. 23 indicate the direction of movement of the bases via movement of the carriages. A first base 220 can be engaged with the first top carriage 202 and a second base 222 can be engaged with the second top carriage 204. Likewise, a first base 224 can be engaged with the first bottom carriage 206 and a second base 226 can be engaged with the second bottom carriage 208. Either of or both of the first base 224 and the second base 226 can comprise a conveyor engaged therewith.

Figure 24:
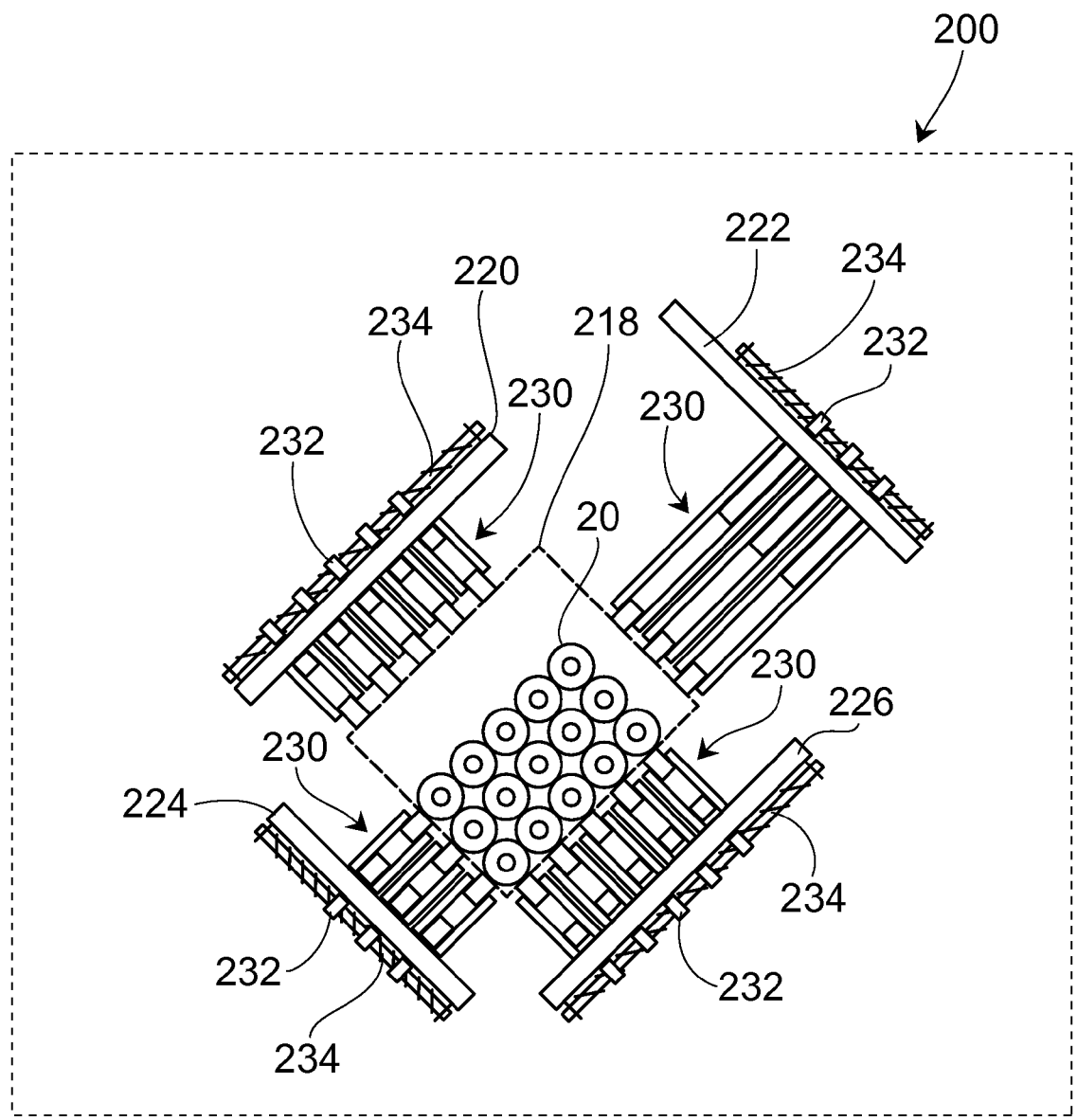
FIGS. 24-26 are front views of modules for modular manufacturing systems illustrating various numbers and sizes of products within a process window in accordance with various non-limiting embodiments.
Figure 25:
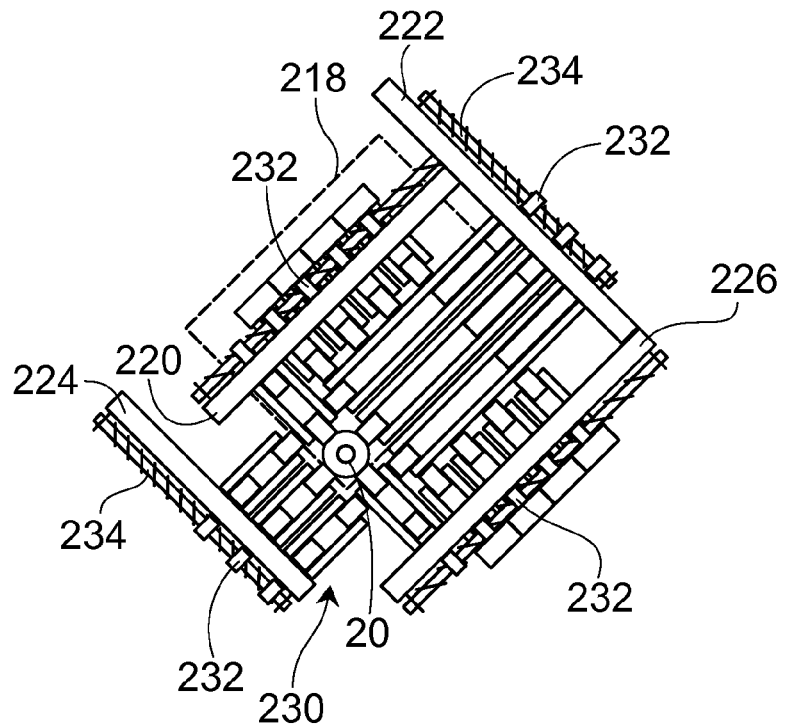
Figure 26:
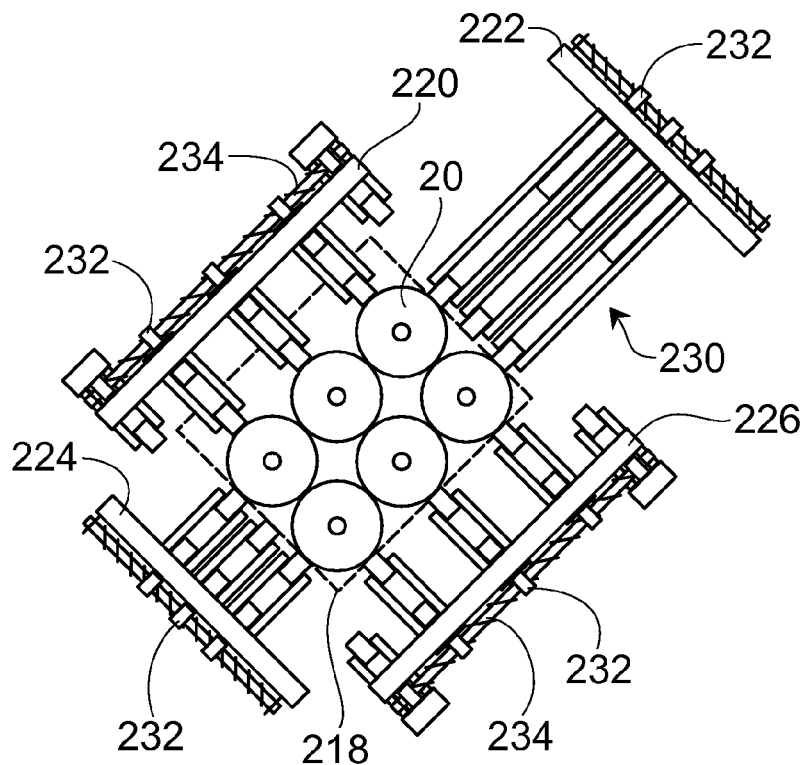

In various embodiments, referring to FIGS. 24-26, the various bases 220, 222, 224, and 226 can have equipment mounts 232 engaged with equipment 230. The equipment 230 can comprise conveyor supports and conveyors, for example. The rolls of paper product 20 can rest on a V-shaped conveyor formed by conveyors of the third base 224 and the fourth base 226. The first base 220, the second base 222, the third base 224, and the fourth base 226 can surround, or at least partially surround, the process window 218 and/or can extend into the process window 218. Any or all of the equipment mounts 232 can be movable with respect to the base that they are mounted on using a threaded rod 234 or other movement mechanism. The threaded rod 234 can be rotated by an actuator and/or other device to move the equipment mounts 232. Such movement of the equipment mounts 232 can allow the equipment 230 mounted thereto to adjust for particular product dimensions and number within the process window 218 (see, for example, the spacing of the equipment mounts 232, and thereby the equipment 230 in FIG. 24 vs. FIG. 26). In one embodiment, the modules 200 can be adjustable to accommodate any suitable number and/or size of products within the process window 218. The process window 218, in some embodiments, can be large enough to accommodate product for a large count package. In various embodiments, the equipment 230 on the second base 222 may be longer than the equipment 230 on the other bases 220, 224, and 226. In other embodiments, the equipment 230 on another base can be longer or all of the equipment 230 can be the same length or a different length. The various bases can function in the same, or a similar, fashion as that described above with respect to FIGS. 18-20 and can process any suitable number and size of rolled products. Referring to FIG. 25, a gap can be positioned between any equipment 230 not contacting the product 20 and other equipment 230, similar to that explained above.

Figure 27:
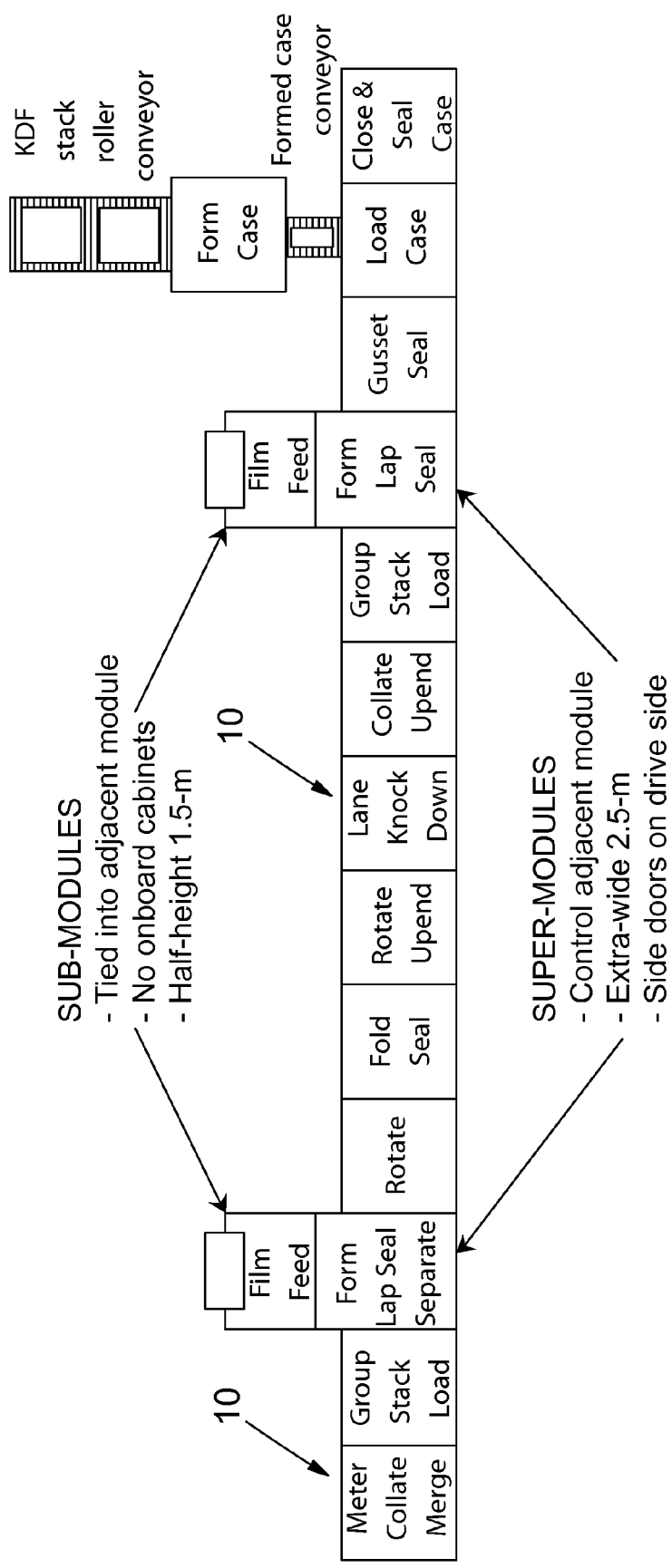
FIG. 27 is a block diagram of an example modular manufacturing system in accordance with one non-limiting embodiment.

FIG. 27 is a diagram of one example of a modular manufacturing system comprising a plurality of modules 10 of the present disclosure. The modules are labeled according to their function in a rolled paper product packaging process. In one embodiment, example dimensions of a single module can be 1.99 meters in length by 2.0 meters in width. The modules, however, can have any suitable height, length, and/or width.

In various embodiments, the modules of the present disclosure can be used in manufacturing paper towels, toilet tissue, facial tissue, wet or dry wipes, diapers, sanitary napkins, and/or cleaning substrates, for example. In one embodiment, the modules can be used in a converting process of paper making and/or a packaging process for rolls of fibrous materials or paper products (e.g., paper towels, facial tissue, and/or toilet tissue). The modules can have any suitable equipment for these processes mounted to them so that they can each perform a specific function or functions. In one embodiment, two modules positioned in series in a manufacturing line may perform the same function, a similar function, or a different function. In various embodiments, some of the modules may be positioned in parallel with other modules in a manufacturing line and may perform the same or a different function. Equipment having different shapes and/or sizes or the same shapes and/or sizes can be mounted to the various modules, or bases thereof, without the need for replacement of the components of the modules (i.e., the same carriages, bases, additional bases, and equipment mounts can be used). In various embodiments, some equipment mounts on the bases may not be utilized in certain circumstances, depending on the equipment being attached to the carriages of the modules. Some examples of functions that can be performed by the modules in a fibrous material roll or paper product roll packaging line are described below. These functions can be performed in the order described or in any other suitable order.

Metering Module—One or more lanes of rolls or packs (i.e., more than one roll within a polymer film or other film) of fibrous materials (e.g., paper towels and/or toilet tissue) are fed into a metering module. In this example metering module, multiple conveyor belt mechanisms can be attached to equipment mounts on the bases of the first carriage and the second carriage (see e.g., FIGS. 1-4). Such mounting can form individual top and bottom driven lanes that output one or more lanes of rolls or packs of fibrous materials (up to the number of infeed lanes). The equipment mounts can be adjusted such that the center-to-center distance of the lanes corresponds to, or generally corresponds to, the width of the rolls or packs being fed through the lanes.

Robotic Module—One or more lanes of rolls or packs of fibrous materials can be fed into a robotic module. The robotic module can comprise a robot configured to pick up one or more of the rolls or packs of fibrous materials and assemble them on a conveying mechanism, such as a V-shaped conveying mechanism. The conveying mechanism can be comprised of one or more conveyors and/or guiderails. The conveying mechanism components can be mounted to equipment mounts on the bottom carriage.

Pushing Module—One or more lanes of rolls or pack of fibrous materials can be fed into a pushing module. The pushing module can comprise a pusher mounted to the equipment mounts of the top carriage or to a fixed position overhead. The pusher can act on the rolls or packs of fibrous materials to separate, group, orient, and/or transfer the rolls or packs on a conveying mechanism, such as V-shaped conveying mechanism. The conveying mechanism can comprise one or more conveyors, lifting mechanisms, and/or guiderails, for example. The conveying mechanism components can be mounted to the equipment mounts of the bottom carriage.

Stacking Module—One or more lanes of rolls or packs of fibrous materials can be fed into a stacking module. A wide belt mechanism can be attached to the equipment mounts on the bases of the second carriage. Optionally, a second wide belt mechanism can be attached to the equipment mounts on the bases of the first carriage. In such an embodiment, the equipment mounts for the wide belt mechanisms can remain stationary, as no lateral adjustment is usually required. In various embodiments, guide rails can be mounted to the equipment mounts on the additional bases or side bases. Such guide rails can be moveable and/or adjustable. The guide rails can provide side support to the rolls or packs of fibrous materials being conveyed through the stacking module. The wide belt mechanisms can pivot in a generally vertical direction to place the rolls or packs of fibrous materials into multiple vertical layers. The layer or layers of rolls or packs of fibrous material can be supported by shelves which can be supported by the vertically-adjusting equipment mounts on the one or more additional bases. The equipment mounts on the additional bases can be adjusted so that the spacing between the shelves corresponds to the height or other dimension of the rolls or packs.

Forming Module—One or more lanes of rolls or packs of fibrous materials in one or more layers can be fed into a forming module. Conveyor belt mechanism can be attached to the equipment mounts on the bases of the first carriage, the bases of the second carriage, and/or one or more of the additional bases or side bases. All or some of the equipment mounts can adjust to align the conveyor belts of the conveyor belt mechanisms with the centerlines of the rolls or packs of fibrous materials being conveyed through the forming module. The rolls or packs of fibrous materials can be conveyed through one or more formers while being enveloped in a film or a polymer film (provided by a Film Feed Module). The polymer film can then be joined to form a tube (with open ends) around the rolls or packs of fibrous materials. If one or more of the formers is to be fixed, the former(s) can be attached to the additional equipment mount or other stationary equipment mounts, for example. If one or more of the formers is to be adjustable, the former(s) can be attached to equipment mounts on the bases of the first carriage, the bases of the second carriage, and/or one or more of the additional bases.

Folding Module—The packs or rolls of fibrous materials can be fed into a folding module. Such packs or rolls can be enveloped in the polymer film tube as described in the forming module section above. Conveyor belt mechanisms, folding plates, and folding mechanisms can be attached to equipment mounts on the bases of the first and second carriages. The equipment mounts can be adjusted to correspond with the pack or rolls dimensions (e.g., height, width).

End Sealing Module—The packs or rolls of fibrous materials enveloped in the closed but unsealed polymer film tube can be fed into an end sealing module. Side conveyor belt mechanisms with heater blocks can be attached to equipment mounts on the bases of the second carriage. The enveloped packs or rolls of fibrous materials can be conveyed through the module while being heat-sealed.

Die Sealing Module—The packs or rolls of fibrous materials enveloped in the closed but unsealed polymer film tube can be fed into a die sealing module. Die sealing mechanisms and gusset seal forming mechanisms can be attached to the equipment mounts of the bases of the first and second carriages. The die sealing die mechanisms can be positioned on stationary equipment mounts (or on equipment mounts that can remain stationary), while the gusset seal forming mechanisms can be positioned on adjustable equipment mounts. A conveyor belt mechanism can be attached to equipment mounts on the bases of the second carriage for conveying the enveloped packs or rolls of fibrous materials through the die sealing module.

Manipulation Module—One or more lanes of rolls of fibrous materials, enveloped rolls of fibrous materials, enveloped packs of rolls of fibrous materials, packs of fibrous materials, bundles of fibrous materials, knock down flats (i.e., flattened cases), unfilled cases, cases filed with rolls or packs of fibrous materials, and/or closed cases of rolls or packs of fibrous materials can be fed into a manipulation module. A combination of conveyor belt mechanisms and lane guides can be attached to the equipment mounts on the bases of the first carriage, the bases of the second carriage, and/or one or more of the additional bases or side bases. These equipment mounts may need to remain stationary or adjust depending on the manipulation step being performed. Robotic mechanisms can also be attached to any of the equipment mounts and/or the frame. Manipulation steps can comprise rotation, upending, knocking over, grouping, orienting, and/or laning, for example, to position the rolls, packs, and/or bundles of fibrous materials into an orientation and/or configuration required by a downstream module or a downstream process.

Case Forming Module—One or more knock down flats can be fed into a case forming module. Conveyor belt mechanisms, guiderails, opener arms, and closer arms can be attached to equipment mounts on the bases of the first and second carriages. Glue or tape applicators can be attached to various equipment mounts on one or more of the additional bases or side bases. The output from the case forming module can be a vertically erected case that is closed and sealed on one end with the other end being open and unsealed for case loading.

Case Loading Module—One or more erected cases and one or more layers of rolls, packs, and/or bundles of fibrous materials can be fed into a case loading module. Conveyor belt mechanisms, pushers, and/or lane guides, for example, can be attached to equipment mounts on the bases of the first carriage, the bases of the second carriage, and/or one or more of the additional bases. The case loading module can output a filled, but open and unsealed case.

Case Closing Module—One or more of the filled cases can be fed into a case closing module. Conveyor belt mechanisms, guiderails, and/or closer arms, for example, can be attached to the equipment mounts on the bases of the first and second carriages. Glue or tape applicators can be attached to various equipment mounts on one or more of the additional bases. The case closing module can output a filled, sealed case of packs or rolls of fibrous materials.

Figure 28:
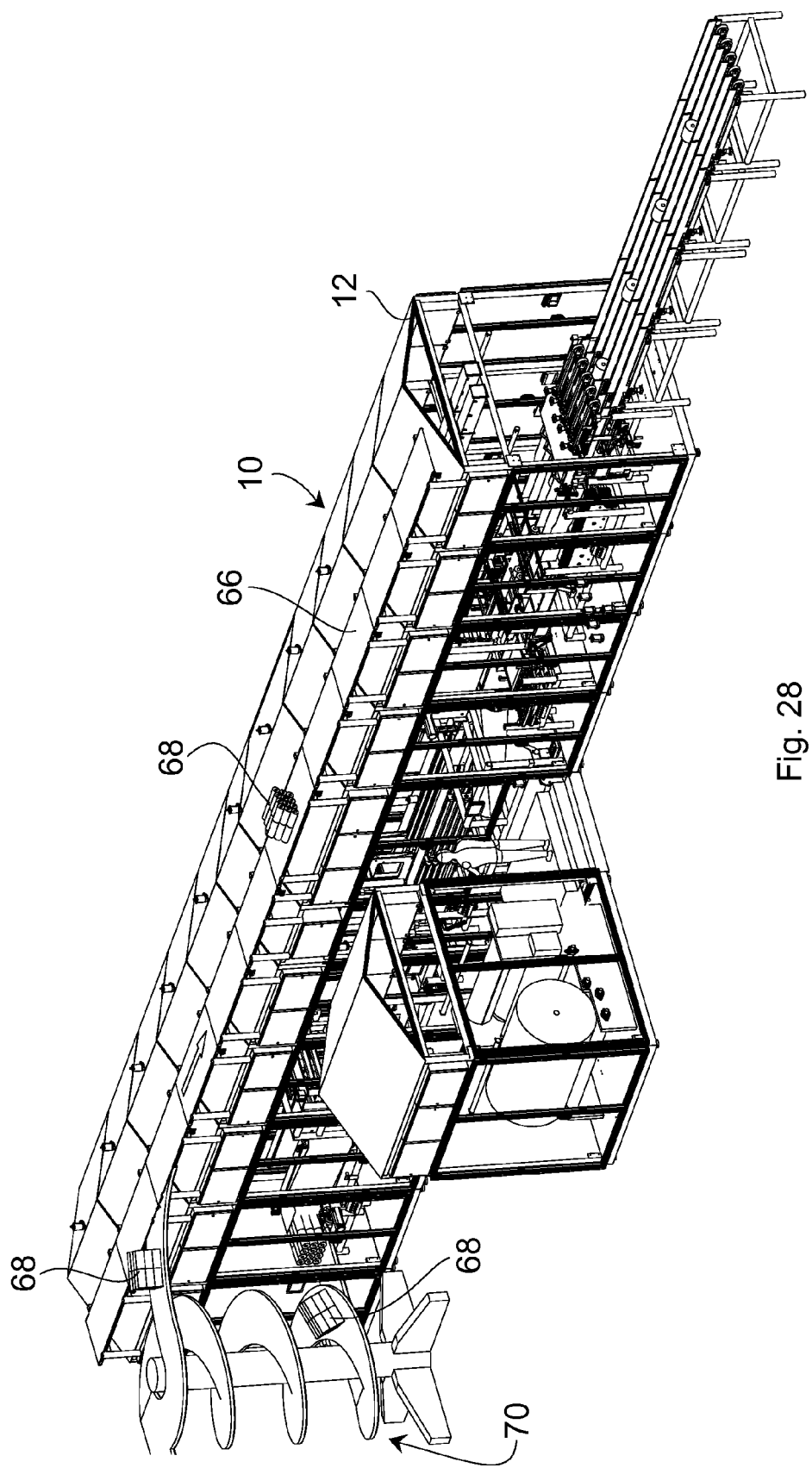
FIG. 28 is an example modular manufacturing system comprising a return conveyor in accordance with one non-limiting embodiment.

FIG. 28 is an illustration of a modular manufacturing system comprising a plurality of modules 10 of the present disclosure. In such an embodiment, a portion of a return conveyor 66 is mounted to or formed with the modules 10 outside of the frame 12. In other embodiments, a portion of the return conveyor 66 is engaged with an outer portion of at least some of the modules 10. In other embodiments, the return conveyor 66 can be mounted within the frame 12. The return conveyor 66 can be used to convey finished product, partially finished product, unfinished product, and/or packaged product (hereafter together referred to as "finished product 68"), after the finished product 68 has run through the modular manufacturing system. The return conveyor 66 can also comprise a spiral section 70 configured to redirect the finished product 68 for shipping, palletizing, and/or for additional manufacturing, such as label application and/or printing. In one embodiment, the spiral section 70 can raise or lower the height of the finished product 68 with respect to the height of the return conveyor 66. The spiral section 70 can convey the finished product 68 to another conveyor.

The term "conveyor," as used herein, describes any device that can move an object over a distance, such as driven rolls, a fluid pressurized bed or belt with directionally oriented apertures in the bed or belt to push product in a suitable direction, a belt operably positioned about one or more driven rolls, non-driven rolls, and/or slides, for example.

The term "equipment," as used herein, describes the process machinery, items, or devices that are configured to be attached to the equipment mounts. Adjustment of the equipment can be decoupled from adjustment of the modules. Stated another way, the modules can be adjusted independent of any adjustments made to the equipment. In various embodiments, some equipment that can be attached to the equipment mounts of the bases of the carriages discussed herein can comprise packaging equipment, such as pushers, diverters, kickers, tuckers, manipulation devices, orientation devices, compression devices, stretching devices, counting devices, conveyors, stackers, folders, lane guides, guide rails, sorters, printers, wrappers, bundlers, sealers, cappers, flippers, bottlers, dispensers, liquid, gel, and/or paste dispensers, application devices, handle application devices, chemical application devices, fragrance application devices, adhesive application devices, label application devices, and/or melting devices, for example, and manufacturing equipment, such as dispensers, liquid, gel, and/or paste, dispensers, folders, converters, printers, melting devices, heating devices, cooling devices, mixing devices, spraying devices, holding devices, fragrance application devices, chemical application devices, label application devices, and/or adhesive application devices. Other suitable equipment for any manufacturing process can also be mounted to the equipment mounts. In one embodiment, more than one piece of equipment can be mounted to a particular equipment mount or a single piece of equipment can be mounted to a particular equipment mount. In some embodiments, not all equipment mounts will have equipment mounted thereto for various operations.

In one embodiment, a modular manufacturing system is provided by the present disclosure. The system can comprise a first module comprising at least a first piece of equipment and a second module comprising at least a second piece of equipment. Any suitable number of pieces of equipment can be provided on each of the modules. Furthermore, any suitable number of modules can be provided, such as three, four, or ten, for example, in a modular manufacturing line. The modules can be positioned adjacent to each other or in parallel or in series. Gaps can be defined between at least some of the modules. In one embodiment, the gaps can be about 0.5 inches or greater, such as 1 inch, for example. In one embodiment, no equipment from the modules extends into the gaps between the various modules. Each of the modules of the module manufacturing system can have the same features as discussed herein. In various embodiments, a conveyor can be positioned on or in each of the modules. In one embodiment, a return conveyor, or a portion of a return conveyor, can be positioned on an outer portion of each of the modules.

In one embodiment, a method for processing rolls of fibrous materials (e.g., paper towels, toilet tissue, facial tissue in single or multi-ply, with any suitable type of fibers) is provided. The method can comprise using a module comprising internal adjustment mechanisms, attaching a first piece of equipment to the module to enable the module to perform a first function, and adjusting the module for the first piece of equipment using the internal adjustment mechanisms. The method can further comprise removing the first piece of equipment from the module, attaching a second piece of equipment to the module to enable the module to perform a second function, and adjusting the module for the second piece of equipment using the internal adjustment mechanisms. The first piece of equipment can be different than, similar to, or the same as the second piece of equipment. The first function can be different than, similar to, or the same as the second function. Either or both of the first piece of equipment and the second piece of equipment can comprise more than one piece of equipment (e.g., a plurality of lane guides). The first and second functions can be one of metering, stacking, film feeding, cutting, trimming, flipping, rotating, orienting, forming, folding, end sealing, die sealing, manipulating, case forming, case loading, and case closing, for example. The module can be used in modular manufacturing systems with a plurality of other similar or the same modules.

In one embodiment, a method for processing rolls of fibrous materials (e.g., paper towels, toilet tissue, facial tissue in single or multi-ply, with any suitable type of fibers) is provided. The method can comprise using a first module and a second module. Each module can comprise one or more internal adjustment mechanisms. The method can further comprise attaching a first piece of equipment to the first module, adjusting the first piece of equipment using the internal adjustment mechanisms of the first module and independent of any adjustment mechanisms on the first piece of equipment, attaching a second piece of equipment to the second module, and adjusting the second piece of equipment using the internal adjustment mechanisms on the second module and independent of any adjustment mechanisms on the second piece of equipment. The first piece of equipment can be different than, similar to, or the same as the second piece of equipment. The first module can be positioned adjacent to, in line with, proximate to, distal from, upstream of, or downstream of the second module. Any other suitable number of modules can be used with the first module and the second module (e.g., upstream or downstream of the first module and the second module).

In one embodiment, a method of transporting rolls of a fibrous material, such as paper towels or toilet tissue, for example, is provided. The method can comprise providing a V-shaped conveying mechanism (see e.g., FIG. 23 bottom carriage), stacking a plurality of the rolls of the fibrous material on the V-shaped conveying mechanism, and transporting the plurality of the rolls of the fibrous material between a first position and a second position. The transporting step can be accomplished through the use of a conveyor engaged with the bases 224 and 226, for example. The first position and the second position can be within a single module or between a plurality of modules. The V-shaped conveying mechanism can be positioned within a module for a modular manufacturing system. The V-shaped conveying mechanism can comprise a carriage comprising a first portion and a second portion. The first portion and the second portion of the carriage can be separate from each other or can form a unitary piece. If the first and second portions of the carriage are separate from each other, the method can comprise independently moving the first portion or the second portion of the carriage relative to the other portion. The method can further comprise positioning the first portion and the second portion of the carriage such that an angle of about 90 degrees or about 120 degrees exists therebetween. In another embodiment, this angle can be in the range of about 50 degrees to about 170 degrees, specifically reciting all 1 degree increments within the specified range. The plurality of the rolls of the fibrous material can comprise rolls of paper towel, rolls of toilet tissue, or other rolled products, for example. Each roll of paper towels or toilet tissue can comprise a core forming a longitudinal axis. The stacking step can comprise stacking the rolls with a longitudinal axis of each core thereof in a direction generally parallel to the direction of transport between the first position and the second position. In other embodiments, stacking step can comprise stacking the rolls with a longitudinal axis of each core thereof in a direction generally perpendicular to the direction of transport between the first position and the second position. The stacking step can be accomplished through the use of robots, for example.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A method of transporting rolls of a fibrous material, the method comprising:
    providing a V-shaped conveying mechanism;
    stacking a plurality of the rolls of the fibrous material on the V-shaped conveying mechanism; and
    transporting the plurality of the rolls of the fibrous material between a first position and a second position; and
    wherein the plurality of the rolls of the fibrous material comprise rolls of paper towel or rolls of toilet tissue and the stacking step comprises stacking the rolls with a longitudinal axis of each core thereof in a direction generally parallel to the direction of transport.

2. The method of claim 1, wherein the V-shaped conveying mechanism is positioned within a module for a modular manufacturing system.

3. The method of claim 2, wherein the V-shaped conveying mechanism comprises a carriage comprising a first portion and a second portion.

4. The method of claim 3, wherein the first portion and the second portion of the carriage are separate from each other.

5. The method of claim 4, comprising independently moving the first portion or the second portion of the carriage relative to the other portion.

6. The method of claim 3, comprising positioning the first portion and the second portion of the carriage such that an angle of about 90 degrees exists therebetween.

7. The method of claim 3, comprising positioning the first portion and the second portion of the carriage such that an angle of about 120 degrees exists therebetween.

* * * * *